United States Patent
Deshpande

(10) Patent No.: US 11,218,235 B2
(45) Date of Patent: Jan. 4, 2022

(54) METHOD FOR DECODING A SERVICE LIST TABLE

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/921,941

(22) Filed: Jul. 7, 2020

(65) Prior Publication Data

US 2020/0336234 A1    Oct. 22, 2020

Related U.S. Application Data

(60) Division of application No. 16/194,210, filed on Nov. 16, 2018, now Pat. No. 10,756,837, which is a continuation of application No. 15/578,436, filed as application No. PCT/JP2016/002657 on Jun. 1, 2016, now Pat. No. 10,439,747.

(60) Provisional application No. 62/239,265, filed on Oct. 8, 2015, provisional application No. 62/171,216, filed on Jun. 4, 2015.

(51) Int. Cl.
| | |
|---|---|
| *H04N 21/84* | (2011.01) |
| *H04N 21/434* | (2011.01) |
| *H04N 21/462* | (2011.01) |
| *H04H 60/82* | (2008.01) |
| *H04H 60/72* | (2008.01) |
| *H04H 60/73* | (2008.01) |
| *H04W 4/06* | (2009.01) |

(52) U.S. Cl.
CPC ............ *H04H 60/82* (2013.01); *H04H 60/72* (2013.01); *H04H 60/73* (2013.01); *H04N 21/4345* (2013.01); *H04N 21/4622* (2013.01); *H04N 21/84* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 10,439,747 | B2* | 10/2019 | Deshpande | ............ H04W 4/06 |
| 10,756,837 | B2* | 8/2020 | Deshpande | ............ H04H 60/72 |
| 2017/0264966 | A1 | 9/2017 | Kitahara et al. | |
| 2018/0152256 | A1 | 5/2018 | Deshpande | |
| 2018/0254940 | A1* | 9/2018 | Kwak | .................. H04L 65/607 |

FOREIGN PATENT DOCUMENTS

WO    2016/111176 A1    7/2016

OTHER PUBLICATIONS

U.S. Appl. No. 62/234,685, filed Sep. 30, 2015. (Year: 2015).*
ATSC Candidate Standard: Signaling, Delivery, Synchronization, and Error Protection (A/331); Jan. 5, 2016; pp. 16-21; Doc. S33-174r1.
U.S. Appl. No. 62/234,685, filed Sep. 30, 2015.
Non-Final Rejection dated Aug. 7, 2019 for U.S. Appl. No. 16/194,210.

(Continued)

*Primary Examiner* — Junior O Mendoza
(74) *Attorney, Agent, or Firm* — ScienBiziP, P.C.

(57) ABSTRACT

A system for generating, transmitting, providing and/or receiving broadcast service signaling.

1 Claim, 23 Drawing Sheets

| serviceCategory | Meaning |
|---|---|
| 0 | Not specified |
| 1 | Linear Audio/ Video (A/V) service |
| 2 | Linear audio only service |
| 3 | App-based service |
| 4 | ESG service (program guide) |
| 5 | EAS service (emergency alert) |
| other values | Reserved for future use |

(56) References Cited

OTHER PUBLICATIONS

Final Rejection dated Dec. 19, 2019 for U.S. Appl. No. 16/194,210.
Notice of Allowance and Fees Due (PTOL-85) dated Apr. 8, 2020 for U.S. Appl. No. 16/194,210.

* cited by examiner

[Fig. 1]
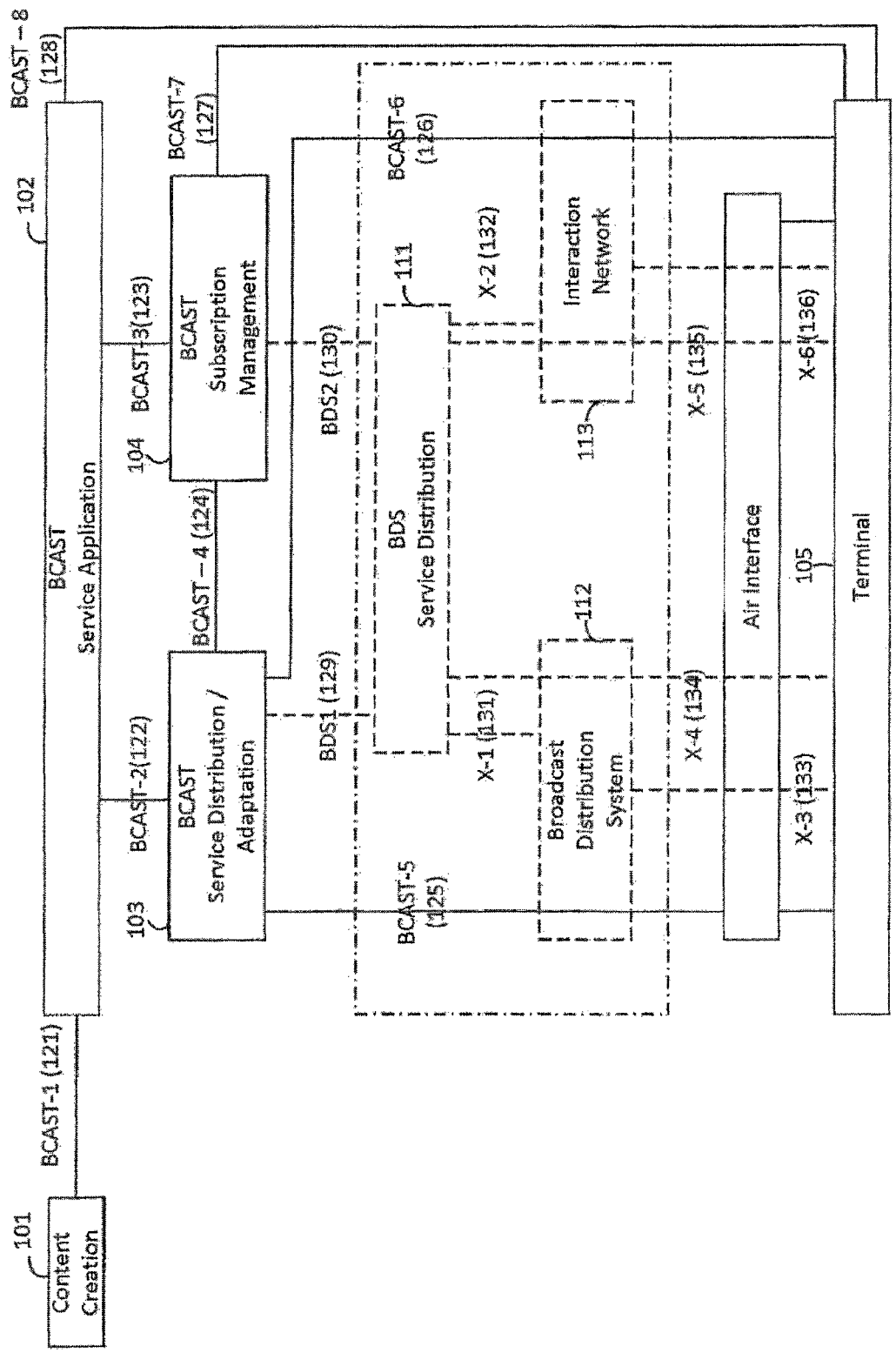

[Fig. 2A]
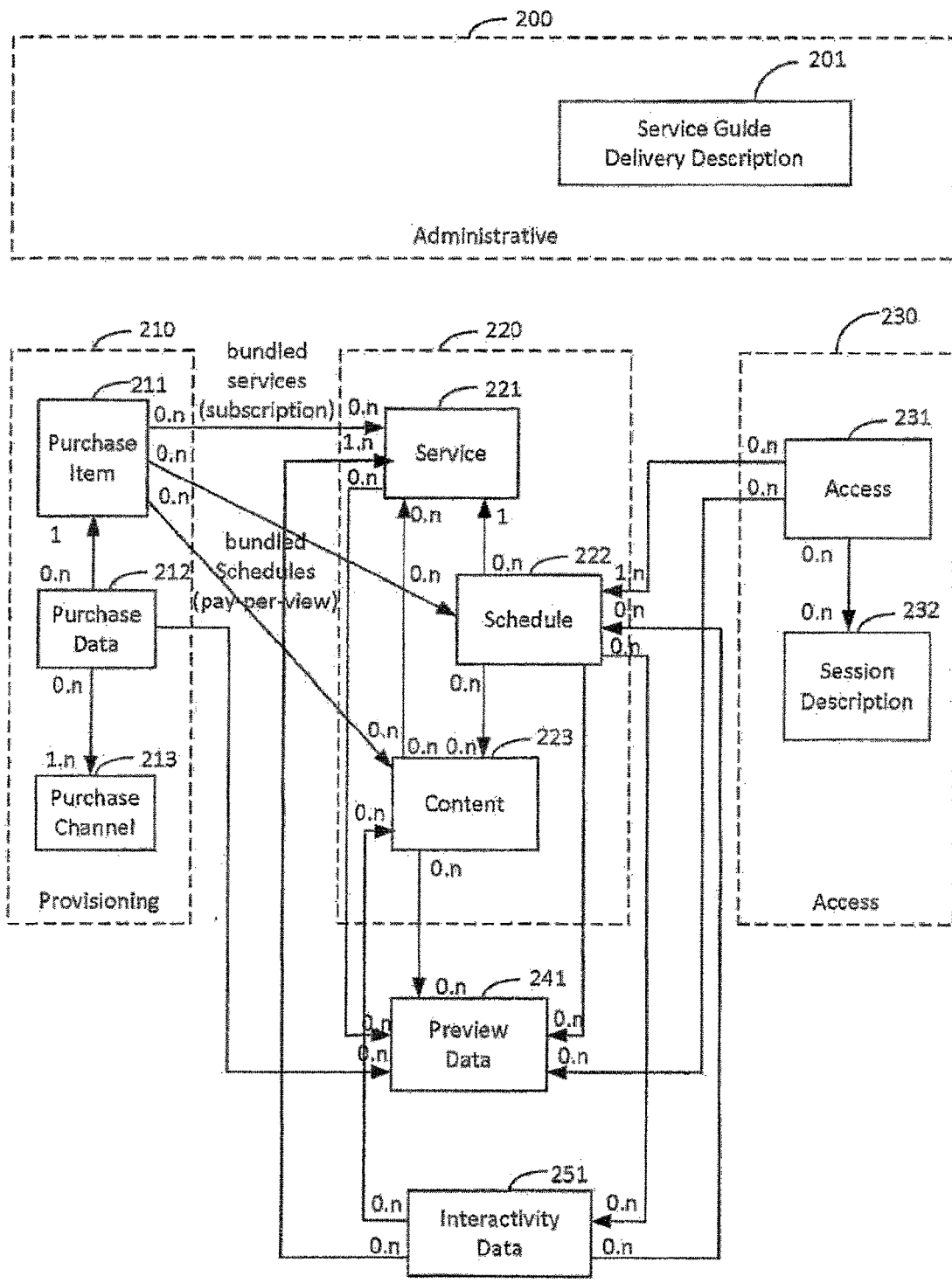
[Fig. 2B]
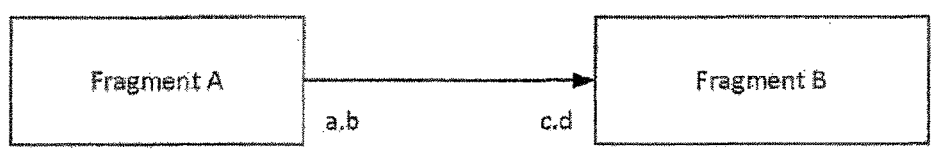

[Fig. 3]
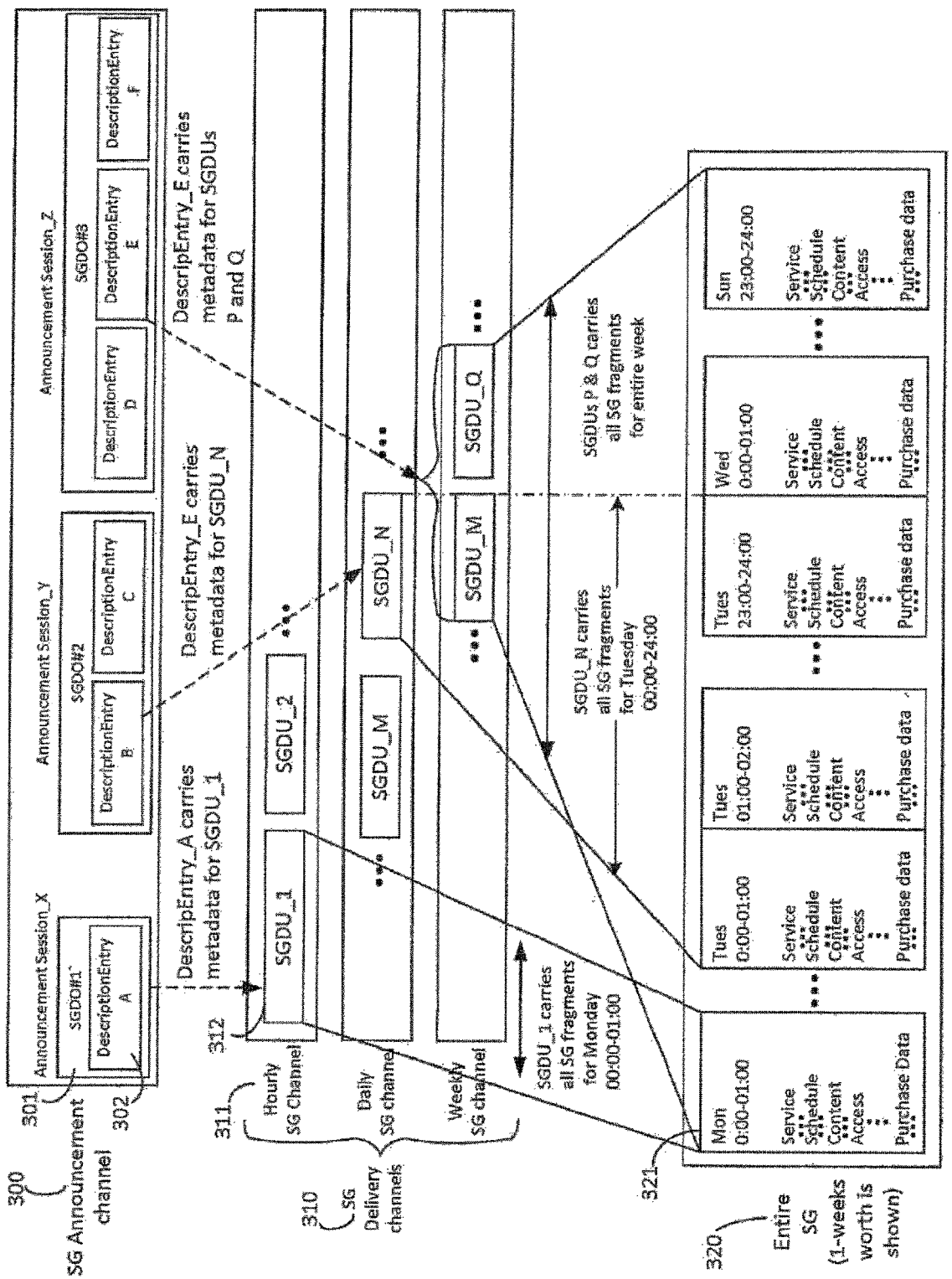
[Fig. 4]
| Name | Type | Category | Cardinality | Description | Data Type |
|---|---|---|---|---|---|

[Fig. 5]

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum and MinorChannelNum | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |

[Fig. 6]

| Name | Type | Category | Cardinality | Description | Data Type |
|---|---|---|---|---|---|
| ServiceMediaExtension | E1 | NM/TM | 1 | Additional information about the media services. Contains the following element: Icon | |
| Icon | E2 | NM/TM | 0..N | Url pointing to icon used to represent the service is ESG. Multiple URLs could be used to point to icons of different width and height or different representation formats. | anyURI |

[Fig. 7]

| Name | Type | Category | Cardinality | Description | Data Type |
|---|---|---|---|---|---|
| ServiceMediaExtension | E1 | NM/TM | 1 | Additional information about the media services. Contains the following attribute: url | |
| url | A | NM/TM | 1 | URL to uniquely identify the video broadcast extension. For example a URI such as the following may be used: http://www.servicexyz.org/XMLSchemas/ASTC/2014/3.0/ServiceExt | anyURI |

[Fig. 8]

| Name | Type | Category | Cardinality | Description | Data Type |
|---|---|---|---|---|---|
| ServiceMediaExtension | E1 | NM/TM | 1 | Additional information about the media services. Contains the following elements: MajorChannelNum, MinorChannelNum, Icon, and element url | |
| MajorChannelNum | E2 | NM/TM | 0..1 | Major channel number of the service. The language is expressed using built-in CML attribute 'xml:lang' with this element | String |
| MinorChannelNum | E2 | NM/TM | 0..1 | Minor channel number of the service. The language is expressed using built-in CML attribute 'xml:lang' with this element | String |
| Icon | E2 | NM/TM | 0..N | Url pointing to icon used to represent the service is ESG. Multiple URLs could be used to point to icons of different width and height or different representation formats. | anyURI |
| url | A | NM/TM | 1 | URL to uniquely identify the video broadcast extension. For example a URI such as the following may be used: http://www.atsc.org/XMLSchemas/ASTC/2014/3.0/ServiceExt | anyURI |

[Fig. 9A]

| Name | Type | Category | Cardinality | Description | Data Type |
|---|---|---|---|---|---|
| AudioLanguage | E1 | NM/ TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag language | string |
| languageSDPTag | A | NM/ TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag'. | String |
| language | A | NM/ TM | 1 | Primary language for the audio component of the service | String |

[Fig. 9B]

| TextLanguage | E1 | NM/TM | 0..N | This element declares for the end user that the textual components of this service are available in the language represented by the value of this element. The textual components can be, for instance, a caption or a sub-title track.<br><br>The textual value of this element can be made available for the end users in different languages.<br><br>In such a case the language used to represent the value of this element is signaled using the builtin XML attribute 'xml:lang'. See section 7 Multilanguage support.<br><br>The same rules and constraints as specified for the element 'AudioLanguage' of assigning and interpreting the attributes 'languageSDPTag' and 'xml:lang' SHALL be applied for this element also.<br><br>Contains the following attribute: languageSDPTag language | string |
|---|---|---|---|---|---|

[Fig. 9C]

| languageSDPTag | A | NM/TO | 0..1 | Identifier of the text language described by the parent 'TextLanguage' element as used in the media sections describing the textual track in a string<br><br>OMA-TS-BCAST_Service_Guide-V1_0_1-20130109-A Page 25 (232) Ó 2013 Open Mobile Alliance Ltd. All Rights Reserved.<br><br>Used with the permission of the Open Mobile Alliance Ltd. under the terms as stated in this document. [OMA-Template-Spec-20130101-I] Session Description. | String |
|---|---|---|---|---|---|
| language | A | NM/TM | 1 | Primary language for the text component of the service | String |

[Fig. 10A]

| Name | Type | Category | Cardinality | Description | Data Type |
|---|---|---|---|---|---|
| AudioLanguage | E1 | NM/TM | 0..N | This element declares for the end users that this service is available with an audio track corresponding to the language represented by the value of this element.<br><br>The textual value of this element can be made available for the end users in different languages.<br><br>In such a case the language used to represent the value of this element is signalled using the builtin XML attribute 'xml:lang'. See section 7, Multi-language support.<br><br>Contains the following attribute: languageSDPTag | string |
| languageSDPTag | A | NM/TO | 0..1 | Identifier of the audio language described by the parent 'AudioLanguage' element as used in the media sections describing the audio track in a Session Description.<br><br>The 'languageSDPTag' may be formatted according to the rules of [RFC 3066], for the described language.<br><br>Each 'AudioLanguage' element declaring the same audio stream may have the same value of the 'languageSDPTag'. | String |

[Fig. 10B]

| TextLanguage | E1 | NM/ TM | 0..N | This element declares for the end user that the textual components of this service are available in the language represented by the value of this element. The textual components can be, for instance, a caption or a sub-title track.<br><br>The textual value of this element can be made available for the end users in different languages.<br><br>In such a case the language used to represent the value of this element is signaled using the builtin XML attribute 'xml:lang'. See section 7 Multilanguage support.<br><br>The same rules and constraints as specified for the element 'AudioLanguage' of assigning and interpreting the attributes 'languageSDPTag' and 'xml:lang' SHALL be applied for this element also.<br><br>Contains the following attribute: languageSDPTag | string |
|---|---|---|---|---|---|

[Fig. 10C]

| languageSDPTag | A | NM/ TO | 0..1 | Identifier of the text language described by the parent 'TextLanguage' element as used in the media sections describing the textual track in a string<br><br>OMA-TS-BCAST_Service_Guide-V1_0_1-20130109-A Page 25 (232) Ó 2013 Open Mobile Alliance Ltd. All Rights Reserved.<br><br>Used with the permission of the Open Mobile Alliance Ltd. under the terms as stated in this document. [OMA-Template-Spec-20130101-I] Session Description. | String |
|---|---|---|---|---|---|

[Fig. 11]
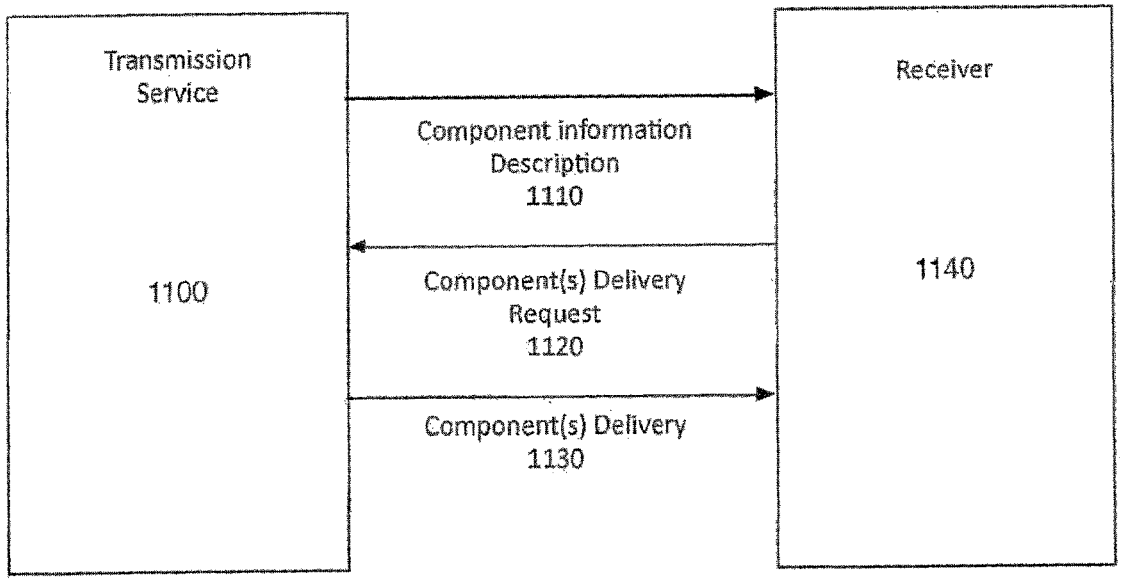
[Fig. 12]
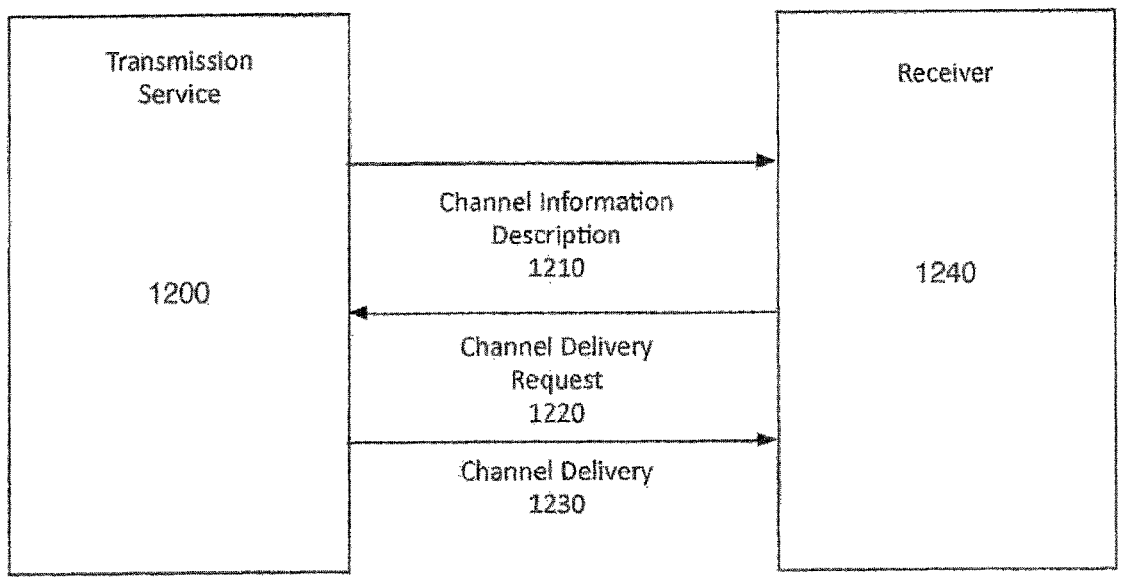
[Fig. 13A]
| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|         component_type | 3 | uimsbf |
|         component_role | 4 | uimsbf |
|         component_protected_flag | 1 | bslbf |
|         component_id | 8 | uimsbf |
|         component_name_length | 6 | uimsbf |
|         component_name_bytes() | var | |
|     } | | |
| } | | |

[Fig. 13B]

| Syntax | No. of Bits | Format |
|---|---|---|
| componentinfo_descriptor() { | | |
|     descriptor_tag | 8 | uimsbf |
|     descriptor_length | 8 | uimsbf |
|     num_components | 8 | uimsbf |
|     for(i=0;i<num_components;i++) { | | |
|         component_type | 3 | uimsbf |
|         component_role | 4 | uimsbf |
|         component_protected_flag | 1 | bslbf |
|         component_id | 8 | uimsbf |
|     } | | |
| } | | |

[Fig. 14A]

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 16 | uimsbf |
|     service_lang_code | 24 | uimsbf |
|     service_genre_code | 8 | uimsbf |
|     service_descr_length | 8 | uimsbf |
|     service_descr_bytes() | var | |
|     icon_url_length | 8 | uimsbf |
|     icon_url_bytes() | var | |
| } | | |

[Fig. 14B]

| Syntax | No. of Bits | Format |
|---|---|---|
| channel_descriptor() { | | |
|     descriptor_tag | 8 | uimsbf |
|     descriptor_length | 8 | uimsbf |
|     major_channel_num | 16 | uimsbf |
|     minor_channel_num | 16 | uimsbf |
|     ext_channel_info_present_flag | 1 | bslbf |
|     if (ext_channel_info_present_flag) { | | |
|         service_lang_code | 24 | uimsbf |
|         service_genre_code | 8 | uimsbf |
|         service_descr_length | 8 | uimsbf |
|         service_descr_bytes() | var | |
|         icon_url_length | 8 | uimsbf |
|         icon_url_bytes() | var | |
|     } | | |
| } | | |

[Fig. 15]

| Element or Attribute (@) Name | | | Cardinality | Data Type | Description |
|---|---|---|---|---|---|
| fichannel | | | | | Root element of the fast information channel information or user service bundle description |
| | Service | | 1...N | | ATSC service description |
| | | ComponentInfo | 1...N | | Contains information about components available in the service. For each component includes information about component type, component role, component name, component identifier, component protection flag. |
| | | @componentType | 1 | unsignedByte | Attribute indicates the type of this component. Value of 0 indicates an audio component. Value of 1 indicates a video component. Value of 2 indicated a closed caption component. Value of 3 indicates an application component. Values 4 to 7 are reserved. |
| | | @componentRole | 1 | unsignedByte | Attribute indicates the role or kind of this component. For audio (when componentType attribute above is equal to 0): values of componentRole attribute are as follows: 0 = Complete main, 1 = Music and Effects, 2 = Dialog, 3 = Commentary, 4 = Visually Impaired, 5 = Hearing Impaired, 6 = Voice-Over, 7-254= reserved, 255 = unknown. For Video (when componentType attribute above is equal to 1) values of componentRole attribute are as follows: 0 = Primary video, 1= Alternative camera view, 2 = Other alternative video component, 3 = Sign language inset, 4 = Follow subject video, 5 = 3D video left view, 6 = 3D video right view, 7 = 3D video depth information, 8 = Part of video array <x,y> of <n,m>, 9 = Follow-Subject metadata, 10-254 = reserved, 255 = unknown. For Closed Caption component (when componentType attribute above is equal to 2) values of componentRole attribute are as follows: 0 = Normal, 1 = Easy reader, 2-254 = reserved, 255 = unknown. When componentType attribute above is between 3 to 7, inclusive, the componentRole shall be equal to 255. |
| | | @componentProtectedFlag | 0..1 | boolean | Attribute indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. |
| | | @componentId | 1 | unsignedByte | Attribute indicates the identifier of this component. The componentId shall be unique within the service. |
| | | @componentName | 0..1 | String | Attribute indicates the human readable name of this component. |

[Fig. 16]

| Element or Attribute (@) Name | | | Cardinality | Data Type | Description |
|---|---|---|---|---|---|
| fichannel | | | | | Root element of the fast information channel information or user service bundle description |
| | Service | | 1...N | | ATSC service description |
| | | Channel | 1 | | Contains information about the channel in the service (or about this service). |
| | | @majorChannelNo | 1 | unsignedShort | Attribute indicates the major channel number of the service. |
| | | @minorChannelNo | 1 | unsignedShort | Attribute indicates the minor channel number of the service. |
| | | @serviceLang | 0..1 | String | Attribute indicates the primary language used in the service. Semantics of xml:lang shall be followed. |
| | | @serviceGenre | 0..1 | unsignedByte | Attribute indicates primary genre of the service. This attribute shall be instantiated to describe the genre category for the service. The <classificationSchemeURI> is http://www.atsc.org/XMLSchemas/mh/2009/1.0/genre-cs/ and the value of serviceGenre shall match a termID value from the classification schema in Annex B of A/153 Part 4 document titled "ATSC-Mobile DTV Standard, Part 4 – Announcement" available at http://www.atsc.org which is incorporated in its entirety here by reference. |
| | | @serviceIcon | 1 | anyURI | Attribute indicates the Uniform Resource Locator (URL) for the icon used to represent this service. |
| | | ServiceDescription | 0..N | | Contains service description possibly in multiple languages. |
| | | @serviceDescrText | 1 | String | Attribute indicates description of the service. |
| | | @serviceDescrLang | 0..1 | String | Attribute indicates the language of the serviceDescrText. Semantics of xml:lang shall be followed. |

[Fig. 17]

```
<xs:schema xmlns:xs="http://www.w3.org/2001/XMLSchema" >
<xs:element name="ComponentInfo" minOccurs="0" maxOccurs="unbounded">
      <xs:complexType>
                  <xs:attribute name="componentType" type="xs:unsignedByte" use="required"/>
                  <xs:attribute name="componentRole" type="xs:unsignedByte" use="required"/>
                  <xs:attribute name="componentProtectedFlag" type="xs:boolean" use="optional"/>
                  <xs:attribute name="componentId" type="xs:unsignedByte" use="required"/>
                  <xs:attribute name="componentName" type="xs:string" use="optional"/>
      </xs:complexType>
</xs:element>
</xs:schema>
```

[Fig. 18]

```xml
<xs:schema xmlns:xs="http://www.w3.org/2001/XMLSchema" >
    <xs:element name="Channel">
        <xs:complexType>
            <xs:simplecontent>
                <xs:attribute name="majorChannelNo" type="xs:unsignedByte" use="required"/>
                <xs:attribute name="minorChannelNo" type="xs:unsignedByte" use="required"/>
                <xs:attribute name="serviceLang" type="xs:string" use="optional"/>
                <xs:attribute name="serviceLang" type="xs:string" use="optional"/>
                <xs:attribute name="serviceGenre" type="xs:unsignedByte" use="optional"/>
                <xs:attribute name="serviceIcon" type="xs:anyURI" use="required"/>
                <xs:attribute name="serviceLang" type="xs:string" use="optional"/>
            </xs:simplecontent>
            <xs:element name="ServiceDescription" type="ServiceDescriptionType" minOccurs="1" maxOccurs="unbounded"/>
        </xs:complexType>
    </xs:element>

<xs:complexType name="ServiceDescriptionType">
        <xs:attribute name="serviceDescrText" type="xs:string" use="required"/>
        <xs:attribute name="serviceDescrLang" type="xs:string" use="optional"/>
    </xs:complexType>
</xs:schema>
```

[Fig. 19A]

| Syntax | No. of Bits | Format |
|---|---|---|
| service_list_table_section() { | | |
|   table_id | 8 | |
|   SLT_section_version | 4 | uimsbf |
|   SLT_section_length | 12 | uimsbf |
|   SLT_protocol_version | 8 | uimsbf |
|   broadcast_stream_id | 16 | uimsbf |
|   SLT_section_number | 4 | uimsbf |
|   last_SLT_section_number | 4 | uimsbf |
|   num_services | 8 | uimsbf |
|   for (i=0; i<num_services;i++) { | | |
|     service_id | 16 | uimsbf |
|     SLT_service_seq_number | 3 | uimsbf |
|     protected | 1 | bslbf |
|     major_channel_number | 10 | uimsbf |
|     minor_channel_number | 10 | uimsbf |
|     service_category | 4 | uimsbf |
|     short_service_name_length  /* m */ | 4 | uimsbf |
|     short_service_name() | 8*m | uimsbf |
|     broadcast_signaling_present | 1 | bslbf |
|     broadband_access_required | 1 | bslbf |
|     if (broadcast_signaling_present) | | |
|       SLS_source_IP_address_present | 1 | bslbf |
|     else | | |
|       reserved | 1 | '1' |
|     reserved | 1 | '1' |
|     SLS_protocol_type | 4 | uimsbf |
|     if (broadcast_signaling_present) { | | |
|       SLS_PLP_ID | 8 | uimsbf |
|       SLS_destination_IP_address | 32 | uimsbf |
|       SLS_destination_UDP_port | 16 | uimsbf |
|       if (SLS_source_address_present) { | | |
|         SLS_source_IP_address | 32 | uimsbf |
|       } | | |
|       SLS_protocol_version | 8 | uimsbf |
|       reserved | 4 | '1111' |
|       num_ext_length_bits  /* b */ | 4 | uimsbf |
|       if (num_ext_length_bits>0) { | | |
|         if (num_ext_length_bits%8) != 0 { | | |
|           reserved1 | (8 - b%8) | '11111.. |
|         } | | |
|         ext_length  /* e */ | b | uimsbf |
|         reserved2() | 8*e | |
|       } | | |
|     } | | |
|     reserved | 4 | '1111' |
|     num_service_level_descriptors | 4 | uimsbf |
|     for (j=0;j<num_service_level_descriptors;j++) { | | |

[Fig. 19B]

|  | |  |
|---|---|---|
|         service_level_descriptor()<br>    }<br>}<br>reserved<br>num_SLT_level_descriptors<br>for (n=0; n<num_SLT_level_descriptors; n++) {<br>    SLT_level_descriptor()<br>}<br>for (k=0; k<N; k++) {<br>    reserved3<br>}<br>} | var<br><br><br>4<br>4<br><br>var<br><br><br>8 | <br><br><br>'1111'<br>uimsbf |

[Fig. 20]

| service_category | Meaning |
|---|---|
| 0x00 | Not specified |
| 0x01 | Linear A/V service |
| 0x02 | Linear Audio only service |
| 0x03 | App-based service |
| 0x04~0x0F | Reserved for future use |

[Fig. 21]

| SLS_protocol_type | Meaning |
|---|---|
| 0x00 | Reserved |
| 0x01 | Protocol A |
| 0x02 | Protocol B |
| 0x03~0x0F | Reserved for future use |

[Fig. 22]

| Syntax | No. of Bits | Format |
|---|---|---|
| inet_signaling_location_descriptor() {<br>    descriptor_tag<br>    descriptor_length<br>    URL_type<br>    URL_bytes()<br>} | <br>8<br>8<br>8<br>8*(descriptor_length-1) | <br><br>uimsbf<br>uimsbf |

[Fig. 23]

| URL_type | Meaning |
|---|---|
| 0x00 | URL to Signaling server |
| 0x01 | URL to ESG server |
| 0x02~0xFF | Reserved for future use |

[Fig. 24]

| Resource(s) Requested | Query Term(s) |
|---|---|
| SLS Set | ?SLS=ALL[&svc=<service_id>] |
| SLS Diff Set | ?SLS=DiffALL[&svc=<service_id>] |
| SLS Template | ?SLS=Template[&svc=<service_id>] |
| USD | ?SLS=USD[&svc=<service_id>] |
| S-TSID | ?SLS=S-TSID[&svc=<service_id>] |
| ESG | ?ESG |

[Fig. 25]

| Table(s) Requested | Query Term(s) |
|---|---|
| SLS Set | ?SLS=ALL |
| SLS Diff Set | ?SLS=DiffALL |
| SLS Template | ?SLS=Template |
| USD | ?SLS=USD |
| S-TSID | ?SLS=S-TSID |
| MPD | ?SLS=MPD |

[Fig. 26A]

| Element or Attribute Name | | | Use | Description |
|---|---|---|---|---|
| slt | | | | Root element of the SLT |
| | @bsid | | 1 | Identifier of the whole Broadcast Stream |
| | @sltSectionVersion | | 1 | Version number of the SLT section. The sltSectionVersion shall be incremented by 1 when a change in the information carried within the slt occurs. When it reaches maximum value, it shall wrap around to 0. |
| | @sltSectionNumber | | 0..1 | The number, counting from 1, of this section of the SLT. Shall default to 1 when not present. |
| | @totalSltSectionNumbers | | 0..1 | The total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. Shall default to 1 when not present. |
| | @language | | 0..1 | A three-character language code per ISO 639.3 indicating the primary language of the services included in this slt instance. |
| | @capabilities | | 0..1 | Required capabilities for decoding and meaningfully presenting the content for all the services in this slt instance. The syntax and semantics of capabilities shall follow the syntax and semantics of the atsc:capabilities element specified under the Content fragment of the ATSC 3.0 Service Announcement & Personalization spec. |
| | InetSigLocation | | 0..1 | Provides a URL telling the receiver where it can acquire any requested type of data from external server(s) via broadband. The format of InetSigLocation shall be as given below in InetSigLocation XML format XML. |
| | Service | | 1..N | ATSC3.0 service entry |
| | | @serviceId | 1 | Integer number that shall uniquely identify this Service within the scope of this Broadcast area. |
| | | @SLTserviceSeqNumber | 1 | This integer number shall indicate the sequence number of the SLT service information with service ID equal to the serviceId attribute above. SLTserviceSeqNumber value shall start at 0 for each service and shall be incremented by 1 every time any attribute in this Service element is changed. If no attribute values are changed compared to the previous Service element with a particular value of ServiceID then SLTserviceSeqNumber shall not be incremented. The SLTserviceSeqNumber field shall wrap back to 0 after reaching the maximum value. |
| | | @protected | 0..1 | When set to true, that one or more components necessary for meaningful presentation is protected. When set to false, this flag indicates that no components necessary for meaningful presentation of the service are protected. Default value is false. |
| | | @majorChannelNo | 1 | An integer number in the range 1 to 1000 that shall represent the "major" channel number of the service. |
| | | @minorChannelNo | 1 | An integer number in the range 1 to 1000 that shall represent the "minor" channel number of the service. |
| | | @serviceCategory | 1 | Attribute indicates the category of this service. |
| | | @shortServiceName | 1 | Short string name of the Service |

[Fig. 26B]

| | | |
|---|---|---|
| @SLSProtocolType | 1 | An attribute indicating the type of protocol of Service Layer Signaling used by this service, coded according to. |
| @slsPlpId | 0..1 | A string representing an integer number indicating the PLP ID of the physical layer pipe carrying the SLS for this service. When attribute slsPlpId is not present, the attributes slsDestinationIpAddress, slsDestinationUdpPort, slsSourceIpAddress, slsMajorProtocolVersion, slsMinorProtocolVersion shall not be present.<br>When attribute slsPlpId is present, the attributes slsDestinationIpAddress, slsDestinationUdpPort, slsSourceIpAddress, slsMajorProtocolVersion, slsMinorProtocolVersion shall be present. |
| @slsDestinationIpAddress | 0..1 | A string containing the dotted-IPv4 destination address of the packets carrying SLS data for this service. |
| @slsDestinationUdpPort | 0..1 | A string containing the port number of the packets carrying SLS data for this service. |
| @slsSourceIpAddress | 0..1 | A string containing the dotted-IPv4 source address of the packets carrying SLS data for this service. |
| @slsMajorProtocolVersion | 0..1 | Major version number of the protocol used to deliver the Service Layer Signalling for this service. Default value is 1. |
| @slsMinorProtocolVersion | 0..1 | Minor version number of the protocol used to deliver the Service Layer Signalling for this service. Default value is 0. |
| @serviceLanguage | 0..1 | A three-character language code per ISO 639.3 indicating the primary language of the service. |
| @broadbandAccessRequired | 0..1 | A Boolean indicating that broadband access is required for a receiver to make a meaningful presentation of the service. Default value is false. |
| @capabilities | 0..1 | Required capabilities for decoding and meaningfully presenting the content for the service with service ID equal to the serviceId attribute above. The syntax and semantics of capabilities shall follow the syntax and semantics of the atsc:capabilities element specified under the Content fragment of the ATSC 3.0 Service Announcement & Personalization spec |
| InetSigLocation | 0..2 | Provides a URL telling the receiver where it can acquire any requested type of data from external server(s) via broadband. The format of InetSigLocation shall be as given below in InetSigLocation XML format XML.<br>When attribute slsPlpId is not present, this element InetSigLocation shall be present and its attribute urlType shall include URL_type 0x00 (URL to signaling server). In this case attribute url shall support the query parameter svc=<service_id> where service_id corresponds to the serviceId attribute for the parent Service element.<br>Alternatively when attribute slsPlpId is not present, the element InetSigLocation shall be present as a child element of the slt root element and the attribute urlType of that InetSigLocation element shall include URL_type 0x00 (URL to signaling server). In this case attribute url for URL_type 0x00 shall support the query parameter svc=<service_id> where service_id corresponds to the serviceId attribute for the parent Service element. |

[Fig. 27]

| InetSigLocation | | 0..1 | Contains URL telling where a receiver can acquire any requested type of data from external server(s) via broadband. |
|---|---|---|---|
| | @urlType | 1 | Attribute indicates the type of URL, this value is coded according to FIG 23. |
| | @url | 1 | This URL can be used by a query term to indicate what the type of resource is by which requesting with this URL. If the type of resource is SLS, it gives a single URL where the receiver can retrieve SLS over broadband for all services fragment in this SLT. In this case, optional svc=<service_id> is very useful and the receiver can request SLS for a specific service if svc query string is appended at the end of query terms. If the type of resource is ESG, it gives a single URL where the receiver can retrieve ESG over broadband for all services described in this SLT. The base URL shall be further extended by one of the query terms from FIG. 24 or FIG. 25, in order to indicate the resource(s) desired. If the serviceCategory is ESG service, this URL shall mean the internet server that receivers can retrieve ESG. |

[Fig.28]

| Service | | 1..N | ATSC3.0 service entry |
|---|---|---|---|
| | @serviceId | 1 | Integer number that shall uniquely identify this Service within the scope of this Broadcast area. |
| | | | . |
| | @broadcastSignalingPresent | 1 | A boolean attribute indicating presence or absence of broadcasting signaling related attributes.<br>If this attribute value is equal to "true" it indicates that the braodcasting related attributes slsPlpId, slsDestinationIpAddress, slsDestinationUdpPort, slsSourceIpAddress, slsMajorProtocolVersion , slsMinorProtocolVersion are present. If this attribute value is equal to "false" it indicates that the braodcasting related attributes slsPlpId, slsDestinationIpAddress, slsDestinationUdpPort, slsSourceIpAddress, slsMajorProtocolVersion , slsMinorProtocolVersion are not present.<br>When the value of broadcastSignalingPresent is equal to 'false' the chil element InetSigLocation of this attribute's parent Service element shall be present and its attribute urlType shall include URL_type 0x00 (URL to signaling server). In this case attribute url shall support the query parameter svc=<service_id> where service_id corresponds to the serviceId attribute for the parent Service element.<br>Alternatively when the value of broadcastSignalingPresent is equal to 'false', the element InetSigLocation shall be present as a child element of the slt root element and the attribute urlType of that InetSigLocation element shall include URL_type 0x00 (URL to signaling server). In this case attribute url for URL_type 0x00 shall support the query parameter svc=<service_id> where service_id corresponds to the serviceId attribute for the parent Service element. |

[Fig. 29]

| Service | | 1..N | ATSC3.0 service entry |
|---|---|---|---|
| | @serviceId | 1 | Integer number that shall uniquely identify this Service within the scope of this Broadcast area. |
| | ... | ... | ... |
| | @serviceLanguage | 0..1 | A three-character language code per ISO 639.3 indicating the primary language of the service. |
| | @broadbandAccessRequired | 0..1 | A Boolean indicating that broadband access is required for a receiver to make a meaningful presentation of the service. Default value is false. |
| | @capabilities | 0..1 | Required capabilities for decoding and meaningfully presenting the content for the service with service ID equal to the serviceId attribute above. The syntax and semantics of capabilities shall follow the syntax and semantics of the atsc:capabilities element specified under the Content fragment of the ATSC 3.0 Service Announcement & Personalization spec |
| | BroadcastSignaling | 0..1 | This element along with its attributes provides broadcast signaling related information.<br>When the BroadcastSignaling element is not present, the child element InetSigLocation of the parent Service element shall be present and its attribute urlType shall include URL_type 0x00 (URL to signaling server). In this case attribute url shall support the query parameter svc=<service_id> where service_id corresponds to the serviceId attribute for the parent Service element.<br>Alternatively when the BroadcastSignaling element is not present, the element InetSigLocation shall be present as a child element of the slt root element and the attribute urlType of that InetSigLocation element shall include URL_type 0x00 (URL to signaling server). In this case attribute url for URL_type 0x00 shall support the query parameter svc=<service_id> where service_id corresponds to the serviceId attribute for the parent Service element. |
| | @slsPlpId | 0..1 | A string representing an integer number indicating the PLP ID of the physical layer pipe carrying the SLS for this service. |
| | @slsDestinationIpAddress | 0..1 | A string containing the dotted-IPv4 destination address of the packets carrying SLS data for this service. |
| | @slsDestinationUdpPort | 0..1 | A string containing the port number of the packets carrying SLS data for this service. |
| | @slsSourceIpAddress | 0..1 | A string containing the dotted-IPv4 source address of the packets carrying SLS data for this service. |
| | @slsMajorProtocolVersion | 0..1 | Major version number of the protocol used to deliver the Service Layer Signalling for this service. Default value is 1. |
| | @slsMinorProtocolVersion | 0..1 | Minor version number of the protocol used to deliver the Service Layer Signalling for this service. Default value is 0. |
| InetSigLocation | | 0..2 | Provides a URL telling the receiver where it can acquire any requested type of data from external server(s) via broadband. The format of InetSigLocation shall be as given below in InetSigLocation XML format XML.<br>When attribute slsPlpId is not present, this element InetSigLocation shall be present and its attribute urlType shall include URL_type 0x00 (URL to signaling server). In this case attribute url shall support the query parameter svc=<service_id> where service_id corresponds to the serviceId attribute for the parent Service element.<br>Alternatively when attribute slsPlpId is not present, the element InetSigLocation shall be present as a child element of the slt root element and the attribute urlType of that InetSigLocation element shall include URL_type 0x00 (URL to signaling server). In this case attribute url shall support the query parameter svc=<service_id> where service_id corresponds to the serviceId attribute for the parent Service element. |

[Fig. 30]

| Element or Attribute Name | | | | Use | Data Type | Short Description |
|---|---|---|---|---|---|---|
| SLT | | | | | | Root element of the SLT |
| | @bsid | | | 1 | unsignedShort | Identifier of the entire broadcast stream. |
| | @sltCapabilities | | | 0..1 | string | Required capabilities for decoding and meaningfully presenting the content for all the services in this SLT instance. |
| | sltInetUrl | | | 0..1 | anyURI | Base URL to acquire ESG or service level signalling files available via broadband for services in this SLT. |
| | | @URLtype | | 0..1 | unsignedByte | Type of files available with this URL |
| | Service | | | 1..N | | Service information |
| | | @serviceId | | 1 | unsignedShort | Integer number that identifies this Service within the scope of this broadcast area. |
| | | @sltSvcSeqNum | | 1 | unsignedByte | Version of SLT service info for this service. |
| | | @protected | | 0..1 | boolean | Indicates whether one or more components needed for meaningful presentation of this service are protected. |
| | | @majorChannelNo | | 0..1 | 1..999 | Major channel number of the service |
| | | @minorChannelNo | | 0..1 | 1..999 | Minor channel number of the service |
| | | @serviceCategory | | 1 | unsignedByte | Service category |
| | | @shortServiceName | | 0..1 | string | Short name of the Service |
| | | @hidden | | 0..1 | boolean | Indicates whether the service is intended for testing or proprietary use, and is not to be selected by ordinary TV receivers. |
| | | @broadbandAccessRequired | | 0..1 | boolean | Indicates whether broadband access is required for a receiver to make a meaningful presentation of the service. |
| | | @svcCapabilities | | 0..1 | string | Required capabilities for decoding and meaningfully presenting content of this service. |
| | | BroadcastSvcSignaling | | 0..1 | | Location, protocol, address, id information for broadcast signaling |
| | | | @slsProtocol | 1 | unsignedByte | Protocol used to deliver the service layer signalling for this service |
| | | | @slsMajorProtocolVersion | 1 | unsignedByte | Major version number of protocol used to deliver Service Layer Signalling for this service. |
| | | | @slsMinorProtocolVersion | 1 | unsignedByte | Minor version number of protocol used to deliver Service Layer Signalling for this service. |
| | | | @slsPlpId | 1 | unsignedByte | PLP ID of the physical layer pipe carrying the broadcast SLS for this service. |
| | | | @slsDestinationIpAddress | 1 | string | A string containing the IPv4 destination address of the packets carrying broadcast SLS data for this service. |
| | | | @slsDestinationUdpPort | 1 | unsignedByte | Port number of the packets carrying broadcast SLS data for this service. |
| | | | @slsSourceIpAddress | 1 | string | A string containing the IPv4 source address of the packets carrying broadcast SLS data for this service. |
| | | svcInetUrl | | 0..N | anyURI | URL to access Internet signalling for this service |
| | | | @URLtype | 0..1 | unsignedByte | Type of files available with this URL |

[Fig. 31]

| URLtype | Meaning |
|---|---|
| 0 | Not specified |
| 1 | URL of Signaling server |
| 2 | URL of ESG server |
| 3 | URL of Service Usage Data Gathering Report server |
| other values | Reserved for future use |

[Fig. 32]

| serviceCategory | Meaning |
|---|---|
| 0 | Not specified |
| 1 | Linear Audio/ Video (A/V) service |
| 2 | Linear audio only service |
| 3 | App-based service |
| 4 | ESG service (program guide) |
| 5 | EAS service (emergency alert) |
| other values | Reserved for future use |

[Fig. 33]

| slsProtocol | Meaning |
|---|---|
| 0 | Reserved |
| 1 | Real-time Object delivery over Unidirectional Transport (ROUTE) |
| 2 | Multimedia Multiplexing Transport Protocol (MMTP) |
| other values | Reserved for future use |

[Fig. 34]

| Terms | Meaning |
|---|---|
| <service_id> | Identifies desired service |
| normal\|diff\|template | Identifies desired mode of files |
| current\|next | Identifies desired current/next version |
| ALL\|RD\|USBD\|STSID\|MPD\|MMT\|MPT\|PAT\|MPIT\|CRIT\|DCIT\|AST\|EMT\|AEI | Identifies desired type of object(s) (Defined further in FIG. 35) |

[Fig. 35]

| Name | Values |
|---|---|
| ALL | All metadata objects for requested service(s) |
| RD | All ROUTE/DASH metadata objects for requested service(s) |
| MMT | All MMT metadata objects for requested service(s) |
| USBD | USBD for requested service(s) |
| STSID | S-TSID for requested service(s) |
| MPD | Dynamic Adaptive Streaming over HTTP (DASH) MPD for requested service(s) |
| PAT | MMT Package Access Table for requested service(s) |
| MPT | MMT Package Table for requested service(s) |
| MPIT | MMT Media Presentation Information Table for requested service(s) |
| CRIT | MMT Clock Relation Information Table for requested service(s) |
| DCIT | MMT Device Capabilities Information Table for requested service(s) |
| AST | Application Signaling Table for requested service(s) |
| EMT | ROUTE/DASH Event Messages Table for requested service(s) |
| AEI | MMT Application Event Information for requested service(s) |

METHOD FOR DECODING A SERVICE LIST TABLE

TECHNICAL FIELD

The present disclosure relates generally to a service signaling.

BACKGROUND ART

A broadcast service is capable of being received by nil users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for both mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. DMA Mobile Broadcast Services Enabler Suite (DMA BCAST) is a specification designed to support mobile broadcast technologies. The DMA BCAST defines technologies that provide IP-based mobile content delivery, which includes a variety of functions such as a service guide, downloading and streaming, service and content protection, service subscription, and roaming.

SUMMARY OF INVENTION

Technical Problem

The foregoing and other objectives, features, and advantages of the invention will be more readily understood upon consideration of the following detailed description of the invention, taken in conjunction with the accompanying drawings.

Solution to Problem

A method for decoding a service guide associated with a bitstream comprising:

(a) receiving a service list table within said service guide that includes a service list table element that is a root element of said service list table;

(b) receiving a sltInetUrl element that is an element of said service list table element that indicates a base URL to acquire electronic service guide or service layer signaling files available via broadband for services in said service list table element;

(c) receiving a first urlType attribute that is an attribute of said sltInetUrl element that indicates types of files available with said base URL;

(d) receiving a service element that is an element of said service list table element that indicates service information;

(e) receiving a serviceId attribute that is an attribute of said service element that identifies said service element within the scope of a broadcast area;

(f) receiving a svcInetUrl element that is an element of said service element that indicates a URL to access Internet signaling for a service;

(g) receiving a second urlType attribute that is an attribute of said svcInetUrl element that indicates types of files available with this URL;

(h) receiving a broadcastSvcsSignaling element that is an element of said service element, if said broadcastSvcsSignaling element is present in said service list table, that provides broadcast signaling related information;

wherein at least one of (A) when said broadcastSvcsSignaling element is not said present in said service list table said svcInetUrl element is present and said second URLtype always has a value of 1, and (B) when said broadcastSvcsSignaling element is not said present in said service list table said sltInetUrl element is present and said first URLtype always has a value of 1 and supports said serviceId attribute path term;

(i) decoding said service guide.

BRIEF DESCRIPTION OF DRAWINGS

FIG. 1 is a block diagram illustrating logical architecture of a BCAST system specified by OMA BCAST working group in an application layer and a transport layer.

FIG. 2A is a diagram illustrating a structure of a service guide for use in the OMA BCAST system.

FIG. 2B is a diagram showing cardinalities and reference direction between service guide fragments.

FIG. 3 is a block diagram illustrating a principle of the conventional service guide delivery method.

FIG. 4 illustrates description scheme.

FIG. 5 illustrates a ServiceMediaExtension with MajorChannelNum and MinorChannelNum.

FIG. 6 illustrates a ServiceMediaExtension with an Icon.

FIG. 7 illustrates a ServiceMediaExtension with a url.

FIG. 8 illustrates a ServiceMediaExtension with MajorChannelNum, MinorChannelNum, Icon, and url.

FIG. 9A illustrates AudioLanguage elements and TextLanguage elements.

FIG. 9B illustrates AudioLanguage elements and TextLanguage elements.

FIG. 9C illustrates AudioLanguage elements and TextLanguage elements.

FIG. 10A illustrates AudioLanguage elements and TextLanguage elements.

FIG. 10B illustrates AudioLanguage elements and TextLanguage elements.

FIG. 10C illustrates AudioLanguage elements and TextLanguage elements.

FIG. 11 illustrates component information description signaling.

FIG. 12 illustrates channel information description signaling.

FIG. 13A illustrates a binary syntax for a component information descriptor.

FIG. 13B illustrates a binary syntax for a component information descriptor.

FIG. 14A illustrates a binary syntax for a channel information descriptor.

FIG. 14B illustrates a binary syntax for a channel information descriptor.

FIG. 15 illustrates an eXtensible Markup Language (XML) syntax and semantics for a component information descriptor.

FIG. 16 illustrates a XML syntax and semantics for a channel information descriptor.

FIG. 17 illustrates a XML schema for a component information descriptor.

FIG. 18 illustrates a XML schema for a channel information descriptor.

FIG. 19A illustrates bitstream syntax for a service list table.

FIG. 19B illustrates bitstream syntax for a service list table.

FIG. 20 illustrates service category information table.

FIG. 21 illustrates protocol information table.

FIG. 22 illustrates Internet signaling location descriptor.

FIG. 23 illustrates Uniform Resource Locator (URL) types.

FIG. 24 illustrates Query term in URL_bytes for Internet signaling location descriptor at service list table level.

FIG. 25 illustrates Query term in URL_bytes for Internet signaling location descriptor at service level.

FIG. 26A illustrates a service list table XML format.

FIG. 26B illustrates a service list table XML format.

FIG. 27 illustrates Internet signaling location descriptor XML format.

FIG. 28 illustrates part of another service list table.

FIG. 29 illustrates part of another service list table.

FIG. 30 illustrates a service list table.

FIG. 31 illustrates code values for URLType.

FIG. 32 illustrates code values for SLT.Service@serviceCategory.

FIG. 33 illustrates code values for SLT.Service@ slsProtocol.

FIG. 34 illustrates path terms in order of appearance in path.

FIG. 35 illustrates metadata object types.

DESCRIPTION OF EMBODIMENTS

Referring to FIG. 1, a logical architecture of a broadcast system specified by OMA (Open Mobile Alliance) Broadcast (BCAST) may include an application layer and a transport layer. The logical architecture of the BCAST system may include a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation (CC) 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some embodiments, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Referring to FIG. 2A, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired. FIG. 2B is a diagram showing cardinalities and reference direction between service guide fragments. The meaning of the cardinalities shown in the FIG. 2A is the following: One instantiation of Fragment A as in FIG. 2B references c to d instantiations of Fragment B. If c=d, d is omitted. Thus, if c>0 and Fragment A exists, at least c instantiation of Fragment B must also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2A, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups 200, 210, 220, and 230.

The aforementioned components may be referred to as basic units or fragments constituting aspects of the service guide, for purposes of identification.

The SGDD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items, which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a Uniform Resource Identifier (URI) to a separate Session Description. Session Description information may be delivered over either the broadcast channel or the interaction channel.

The Session Description fragment 232 may be included in the Access fragment 231, and may provide location information in a URI form so that the terminal may detect information on the Session Description fragment 232. The Session Description fragment 232 may provide address information, codec information, etc., about multimedia content existing in the session. As such, the 'SessionDescription' is a Service Guide fragment, which provides the session information for access to a service or content item. Further, the Session Description may provide auxiliary description information, used for associated delivery procedures. The Session Description information is provided using either syntax of Session Description Protocol (SDP) in text format, or through a 3rd Generation Partnership Project (3GPP) Multimedia Broadcast/Multicast Service (MBMS) User Service Bundle Description [3GPP TS 26.346] (USBD). Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express all the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, Short Message Service (SMS) template, Multimedia Messaging Service (MMS) template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityDat'a fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which all purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Referring to FIG. 3, an exemplary block diagram illustrates aspects of a service guide delivery technique. The Service Guide Deliver Descriptor fragment 201 may include the session information, grouping information, and notification message access information related to all fragments containing service information. When the mobile broadcast service-enabled terminal 105 turns on or begins to receive the service guide, it may access a Service Guide Announcement Channel (SG Announcement Channel) 300. The SG Announcement Channel 300 may include at least one of SGDD 200 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the Service Guide (SG) announcement channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present all of the SGDUs 312 to the user according to the corresponding group information.

Once the transport information is acquired, the terminal 105 may access all of the Delivery Channels acquired from a DescriptorEntry 302 in an SGDD 301 on an SG Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). However, the service guide/reception systems may be used with any suitable communication and/or broadcast system.

Referring to FIG. 4, the scheme may include, for example, (1) Name, (2) Type, (3) Category, (4) Cardinality, (5) Description, and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n-1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a Television (TV) channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use all declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specifiy the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national/local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [MIGFG]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

After reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information defined within the programming guide to appropriately render the information in a manner suitable for the viewer. In particular, the traditional National Television System Committee (NTSC) television stations typically have numbers such as, 2, 4, 6, 8, 12, and 49. For digital services, program and system information protocol includes a virtual channel table that, for terrestrial broadcasting defines each digital television service with a two-part number consisting of a major channel followed by a minor channel. The major channel number is usually the same as the NTSC channel for the station, and the minor channels have numbers depending on how many digital television services are present in the digital television multiples, typically starting at 1. For example, the analog television channel 9, WUSA-TV in Washington, D.C., may identify its two over-the-air digital services as follows: channel 9-1 WUSA-DT and channel 9-2 9-Radar. This notation for television channels is readily understandable by a viewer, and the programming guide elements may include this capability as an extension to the programming guide so that the information may be computationally efficiently processed by the receiving device and rendered to the viewer.

Referring to FIG. 5, to facilitate this flexibility an extension, such as ServiceMediaExtension, may be included with the programming guide elements, which may specify further services. In particular, the ServiceMediaExtension may have a type element E1, a category NM/TM, with a cardinality of 1. The major channel may be referred to as MajorChannelNum, with a type element E2, a category NM/TM, a cardinality of 0 . . . 1, and a data type of string. By including the data type of string, rather than an unsignedByte, permits the support of other languages which may not necessarily be a number. The program guide information, including the ServiceMediaExtension may be included in any suitable broadcasting system, such as for example, ATSC.

After further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer associates a graphical icon with a particular program and/or channel and/or service. In this manner, the graphical icon should be selectable by the system, rather than being non-selectable.

Referring to FIG. 6, to facilitate this flexibility an extension may be included with the programming guide elements which may specify an icon.

After yet further reviewing the set of programming guide elements and attributes; (1) Name; (2) Description; (3) AudioLanguage; (4) TextLanguage; (5) ParentalRating; (6) TargetUserProfile; and (7) Genre it was determined that the receiving device still may have insufficient information suitable to appropriately rendering the information in a manner suitable for the viewer. In many cases, the viewer may seek to identify the particular extension being identified using the same extension elements. In this manner, a url may be used to specifically identify the particular description of the elements of the extension. In this manner, the elements of the extension may be modified in a suitable manner without having to expressly describe multiple different extensions.

Referring to FIG. 7, to facilitate this flexibility an extension may be included with the programming guide elements, which may specify a url.

Referring to FIG. 8, to facilitate this overall extension flexibility an extension may be included with the programming guide elements, which may specify an icon, major channel number, minor channel number, and/or url.

In other embodiments, instead of using Data Type "string" for MajorChannelNum and MinorChannelNum elements, other data types may be used. For example, the data type unsignedInt may be used. In another example, a string of limited length may be used, e.g. string of 10 digits. An exemplary XML schema syntax for the above extensions is illustrated below.

```
<xs:element name="ServiceMediaExtension "
type="SerExtensionType" minOccurs="0" maxOccurs="unbounded"/>
<xs:complexType name="SerExtensionType">
  <xs:sequence>
    <xs:element name="Icon" type="xs:anyURI" minOccurs="0"
     maxOccurs="unbounded"/>
    <xs:element name="MajorChannelNum" type="LanguageString"
     minOccurs="0" maxOccurs="1"/>
    <xs:element name="MinorChannelNum" type="LanguageString"
     minOccurs="0" maxOccurs="1"/>
  </xs:sequence>
  <xs:attribute name="url" type="xs:anyURI" use="required"/>
</xs:complexType>
```

In some embodiments the ServiceMediaExtension may be included inside a OMA "extension" element or may in general use OMA extension mechanism for defining the ServiceMediaExtension.

In some embodiments the MajorChannelNum and MinorChannelNum may be combined into one common channel number and represented. For example a ChannelNum string may be created by concatenating MajorChannelNum followed by a period ('.') followed by MinorChannelNum. Other such combinations are also possible with period replaced by other characters. Similar concept can be applied when using unsignedInt or other data types to represent channel numbers in terms of combining MajorChannelNum and MinorChannelNum into one number representation.

In yet another embodiment a MajorChannelNum.MinorChannelNum could be represented as "ServiceId" element (Service Id) for the service.

In another embodiment, the ServiceMediaExtension may only be used inside a PrivateExt element within a Service fragmentAn exemplary XML schema syntax for such an extension is illustrated below.

```
<element name=" ServiceMediaExtension " type=" SerExtensionType ">
    <annotation>
        <documentation>
    This element is a wrapper for extensions to OMA BCAST SG
Service fragments. It may only be used inside a PrivateExt element within
a Service fragment.

</annotation>
</element>
<xs:complexType name="SerExtensionType">
    <xs:sequence>
        <xs:element name="Icon" type="xs:anyURI" minOccurs="0"
         maxOccurs="unbounded"/>
        <xs:element name="MajorChannelNum" type="LanguageString"
         minOccurs="0" maxOccurs="1"/>
        <xs:element name="MinorChannelNum" type="LanguageString"
         minOccurs="0" maxOccurs="1"/>
    </xs:sequence>
    <xs:attribute name="url" type="xs:anyURI" use="required"/>
</xs:complexType>
```

In other embodiments some of the elements above may be changed from E2 to E1. In other embodiments the cardinality of some of the elements may be changed. In addition, if desired, the category may be omitted since it is generally duplicative of the information included with the cardinality.

It is desirable to map selected components of the Advanced Television Systems Committee (ATSC) service elements and attributes to the OMA service guide service fragment program guide. For example, the "Description" attribute of the OMA service guide fragment program guide may be mapped to "Description" of the ATSC service elements and attributes, such as for example ATSC-Mobile Digital Television (DTV) Standard, Part 4—Announcement, other similar broadcast or mobile standards for similar elements and attributes. For example, the "Genre" attribute of the OMA service guide fragment program guide may be mapped to "Genre" of the ATSC service elements and attributes, such as for example ATSC-Mobile DTV Standard, Part 4—Announcement, other similar standards for similar elements and attributes. In one embodiment Genre scheme as defined in Section 6.10.2 of ATSC A153/Part 4 may be utilized For example, the "Name" attribute of the OMA service guide fragment program guide may be mapped to "Name" of the ATSC service elements and attributes, such as for example ATSC-Mobile DTV Standard, Part 4—Announcement, other similar standards for similar elements and attributes. Preferably, the cardinality of the name is selected to be 0 . . . N, which permits the omission of the name which reduces the overall bit rate of the system and increase flexibility. For example, the "ParentalRating" attribute of the OMA service guide fragment program guide may be mapped to a new "ContentAdvisory" of the ATSC service element and attributes, such as for example ATSC-Mobile DTV Standard, Part 4—Announcement, or similar standards for similar elements and attributes. For example, the "TargetUserProfile" attribute of the OMA service guide fragment program guide may be mapped to a new "Personalization" of the ATSC service element and attributes, such as for example ATSC-Mobile DTV Standard, Part 4—Announcement, or similar standards for similar elements and attributes.

Referring to FIGS. 9A, 9B, 9C, the elements AudioLanguage (with attribute languageSDPTag) and TextLanguage (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio/ text language described by the parent element as used in the media sections describing audio/ text track in a session description. In another embodiment the attribute languageSDPTag could be made optional and the elements AudioLanguage and TextLanguage could be included with an attribute "Langugage" with data type "string" which can provide language name.

An example XML schema syntax for this is shown below.

```
<xs:complexType name="AudioOrTextLanguageType">
    <xs:simpleContent>
        <xs:extension base="LanguageString">
            <xs:attribute name="languageSDPTag" type="xs:string"
                use="optional"/>
            <xs:attribute name="language" type="xs:string"
                use="required"/>
        </xs:extension>
    </xs:simpleContent>
</xs:complexType>
```

In another embodiment the attributes languageSDPTag for the elements AudioLanguage and TextLanguage could be removed. An example XML schema syntax for this is shown below.

```
<xs:complexType name="AudioOrTextLanguageType">
    <xs:simpleContent>
        <xs:extension base="LanguageString">
            <xs:attribute name="language" type="xs:string"
                use="required"/>
        </xs:extension>
```

-continued

```
    </xs:simpleContent>
</xs:complexType>
```

Referring to FIGS. 10A, 10B, 10C, the elements AudioLanguage (with attribute languageSDPTag) and TextLanguage (with attribute languageSDPTag) could be included if Session Description Fragment is included in the service announcement, such as for example ATSC-Mobile DTV Standard, Part 4—Announcement, or similar standards for similar elements and attributes. This is because the attribute languageSDPTag for the elements AudioLanguage and TextLanguage are preferably mandatory. This attribute provides identifier for audio/text language described by the parent element as used in the media sections describing audio/text track in a session description. In another embodiment the attribute languageSDPTag could be made optional.

An example XML schema syntax for this is shown below.

```
<xs:complexType name="AudioOrTextLanguageType">
    <xs:simpleContent>
        <xs:extension base="LanguageString">
            <xs:attribute name="languageSDPTag" type="xs:string"
                use="optional"/>
        </xs:extension>
    </xs:simpleContent>
</xs:complexType>
```

In another embodiment the attributes languageSDPTag for the elements AudioLanguage and TextLanguage could be removed. An example XML schema syntax for this is shown below.

```
<xs:complexType name="AudioOrTextLanguageType">
    <xs:simpleContent>
        <xs:extension base="LanguageString">
        </xs:extension>
    </xs:simpleContent>
</xs:complexType>
```

In another embodiment the attribute "language" could be mapped to ATSC service "language" element and could refer to the primary language of the service.

In another embodiment the value of element "AudioLanguage" could be mapped to ATSC service "language" element and could refer to the primary language of the audio service in ATSC.

In another embodiment the value of element "TextLanguage" could be mapped to ATSC service "language" element and could refer to the primary language of the text service in ATSC. In some cases the text service may be a service such as closed caption service. In another embodiment the elements AudioLanguage and TextLanguage and their attributes could be removed.

For the service guide, traditionally the consideration has been to reference the linear stream of the audio-visual content, generally referred to as a "linear service". With the proliferation of applications also referred to as "apps" it is desirable to reference app-based (i.e. application based) services which are other programs that are executed and provide a service to the user, generally referred to as "app-based service". It is desirable to map notification stream of the "linear service" or the "app-based service" using the Notification ServiceType element 7 of the OMA service guide fragment program guide.

It is also desirable to enable the notification of other services using the ServiceType element of the OMA service guide fragment program guide. The ServiceType may use the range "reserved for proprietary use" to include additional service types. For example, ServiceType element value 224 may be used to identify an "App-Based Service" that includes an application component to be used. For example, ServiceType element value 225 may be used to identify an "App-Based Service" that includes non-real time content to be used. For example, ServiceType element value 226 may be used for to identify an "App-Based Service" that includes an on-demand component to be used. In this manner, these app-based services are mapped to the Notification Service-Type element 7, and thus are readily omitted when the Notification ServiceType element 7 does not indicate their existence, thereby reducing the complexity of the bitstream.

In another embodiment, rather than mapping the notification to the value of 7 for OMA ServiceType, an additional ServiceType value may be defined. A Notification ServiceType element 227 of the OMA service guide fragment program guide may be used to identify an "App-Based Service" that includes an application component to be used including a notification stream component.

It is to be understood that other values may likewise be used for the described services. For example instead of service type values 224, 225, 226, and 227 above the service type values 240, 241, 242, 243 may be used. In yet another case the service type values 129, 130, 131, 132 may instead be used.

In yet another embodiment instead if using ServiceType values from the range (128-255) reserved for proprietary use, the values from the range (11-127) reserved for future use may be used.

In yet another embodiment when using OMA BCAST Guide 1.1 from instead if using ServiceType values from the range (128-255) reserved for proprietary use, the values from the range (14-127) reserved for future use may be used.

In yet another embodiment when using OMA BCAST Guide 1.1 from [instead if using ServiceType values from the range (128-255) reserved for proprietary use, the values from the range (128-223) reserved for other OMA enablers may be used.

In yet another embodiment when using OMA BCAST Guide 1.1 from instead if using ServiceType values from the range (128-255) reserved for proprietary use, the values may be restricted in the range (224-255) reserved for other OMA enablers may be used.

In another embodiment, for example, an additional ServiceType element value 228 may be used to identify a "Linear Service". For example, an additional ServiceType element value 229 may be used to identify an "App-Based Service" that includes a generalized application based enhancement. In this manner, the service labeling is simplified by not expressly including services type for application component, non-real time content, nor on-demand component.

In another embodiment, for example, an additional or alternative ServiceType element value 230 may be used for to identify an "App-Based Service" that includes an application based enhancement. In this manner, the notification is further simplified by not expressly including services type for linear service, application component, non-real time content, nor on-demand component.

In another embodiment, for example, the ServiceType element value 1 also may be used for to identify a "Linear Service". In this manner, the Linear Element is incorporated within the existing syntax structure. In this case the "Linear service" is mapped to Basic TV service.

In another embodiment, for example, the ServiceType element value 11 may be used for to identify a streaming on demand component, which may be an app-based service with app-based enhancement including an on demand component. For example, ServiceType element value 12 may be used to identify a file download on demand component, which may be an app-based enhancement including a non-real time content item component.

In another embodiment, any one of the above service type values may be indicated by a value within another element. For example, an AvailableContent element or attribute and its values could take one of the values from application component, non-real time content, on-demand component, and/or notification.

In another embodiment, the ServiceType value allocation may be done hierarchically. For example, the main service types may be a linear service and an app-based service, and each of these two types of services could include zero or more app-based enhancements components which can include application component, non-real time content, on demand component, and/or notification, a hierarchical allocation of ServiceType values may be done. In this case for "ServiceType" one of the bits of "unsigned Byte" (date type of ServiceType) could be used to signal a linear service (bit with value set to 1) or an app-based service (bit with value set to 0). Then the rest of the bits can signal the service types. An example is illustrated as follows:

224 (11100000 binary) Linear Service with App-Based Enhancement including application component
240 (11110000 binary) App-Based Service with App-Based Enhancement including application component
225 (11100001 binary) Linear Service with App-Based Enhancement including non-real time content
241 (111100001 binary) App-Based Service with App-Based Enhancement including non-real time content
226 (11100010 binary) Linear Service with App-Based Enhancement including on demand component
242 (11110010 binary) App-Based Service with App-Based Enhancement including on demand component
227 (11100011 binary) Linear Service with App-Based Enhancement including notification stream component
243 (11110011 binary) App-Based Service with App-Based Enhancement including notification stream component
228 (11100100 binary) Linear Service with generic service type
243 (11110100 binary) App-Based Service with generic service type The generic service type may refer to the service different than a service which has application component or non-real-time content or on demand component. In some case the generic service type may be an "unknow" service type.

In yet another embodiment, the values may use contiguous ServiceType values. For example the service type values could be assigned as follows:

224 Linear Service with App-Based Enhancement including application component
225 App-Based Service with App-Based Enhancement including application component
226 Linear Service with App-Based Enhancement including non-real time content
227 App-Based Service with App-Based Enhancement including non-real time content
228 Linear Service with App-Based Enhancement including on demand component
229 App-Based Service with App-Based Enhancement including on demand component 230 Linear Service with App-Based Enhancement including notification stream component 231 App-Based Service with App-Based Enhancement including notification stream component In yet another embodiment the Linear/App-based service: App may be further split into two service types (and thus four total service types as) follows:

Lienar service: primary App (e.g. ServiceType value 224)

Linear service: non primary app. (e.g. ServiceType value 225)

App-based service: primary App (e.g. ServiceType value 234)

App based service: non primary app. (e.g. ServiceType value 235)

Where a Primary App, may be an app which is activated as soon as the underlying service is selected. Also non-primary apps may be started later in the service.

In some embodiments, the service of the type Linear Service: On-Demand component may be forbidden. In that case, no ServiceType value may be assigned for that type of service.

Additional embodiments related to service signaling are described as follows. In general service announcement and service signaling may be as follows. Service Announcement may include information about programming and services that is designed to allow the viewer or user to make an informed selection about service or content. Service Signaling may include information that enables the receiver to locate and acquire services and to perform basic navigation of the service.

Referring to FIG. 11 component information description signaling is described. The transmission service provider 1100 is an example of a provider of service configured to enable television services to be provided. For example, transmission service provider 1100 may include public over-the-air television networks, public or subscription-based satellite television service provider networks, over-the-top service networks, broadcast service networks, and public or subscription-based cable television provider networks. It should be noted that although in some examples transmission service provider 1100 may primarily be used to enable television services to be provided, transmission service 1100 provider may also enable other types of data and services to be provided according to any combination of the telecommunication protocols and messages described herein. Transmission service provider 1100 may comprise any combination of wireless and/or wired communication media. Transmission service provider 1100 may include coaxial cables, fiber optic cables, twisted pair cables, wireless transmitters and receivers, routers, switches, repeaters, base stations, or any other equipment that may be useful to facilitate communications between various devices and sites.

With respect to FIG. 11, receiver 1140 may include any device configured to receive a service from transmission service provider 1100. For example, a receiver 1140 may be equipped for wired and/or wireless communications and may include televisions, including so-called smart televisions, set top boxes, and digital video recorders. Further, the receiver 1140 may include desktop, laptop, or tablet computers, gaming consoles, mobile devices, including, for example, smartphones, cellular telephones, and personal gaming devices configured to receive service from transmission service provider 1100.

As a part of receiving service from transmission service 1100, the receiver 1140 may receive signaling information which may provide information about various media streams and data that may be received via delivery mechanism. In one embodiment the signaling information from transmissions service provider 1100 may include component information description 1110. An example of component information description is provided later with respect to FIGS. 13A, 13B, 15, and 17. After receiving this component information description 1110, the receiver 1140 may parse it or decode it. In one example the receiver 1140 may not be able to parse further signaling information until it parses the component information description 1110. In one example the receiver 1140 may display some or all of component information description 1110 to the viewer after decoding, parsing and rendering it. In some cases it may display this information on screen of the receiver device which can be viewed by the viewer. In an example case the viewer may make a decision based on this information that is received, parsed and displayed. In one example the decision may be to receive one or more components of the service. In this case the receiver 1140 may send a components delivery request 1120 for one or more components of the service to the transmission service provider 1100. In one example the receiver 1140 may receive delivery of requested components from transmission service 1110.

Referring to FIG. 12, channel information description signaling is described. The transmission service provider 1200 is an example of a provider of service configured to enable television services to be provided. For example, transmission service provider 1200 may include public over-the-air television networks, public or subscription-based satellite television service provider networks, over-the-top service networks, broadcast service networks, and public or subscription-based cable television provider networks. It should be noted that although in some examples transmission service provider 1200 may primarily be used to enable television services to be provided, transmission service provider 1200 may also enable other types of data and services to be provided according to any combination of the telecommunication protocols and messages described herein. Transmission service provider 1200 may comprise any combination of wireless and/or wired communication media. Transmission service provider 1200 may include coaxial cables, fiber optic cables, twisted pair cables, wireless transmitters and receivers, routers, switches, repeaters, base stations, or any other equipment that may be useful to facilitate communications between various devices and sites.

Referring to FIG. 12, the receiver 1240 may include any device configured to receive a service from transmission service provider 1200. For example, the receiver 1240 may be equipped for wired and/or wireless communications and may include televisions, including so-called smart televisions, set top boxes, and digital video recorders. Further, the receiver 1240 may include desktop, laptop, or tablet computers, gaming consoles, mobile devices, including, for example, smartphones, cellular telephones, and personal gaming devices configured to receive service from transmission service provider 1200.

As a part of receiving service from transmission service provider 1200, the receiver 1240 may receive signaling information which may provide information about various media streams and data that may be received via delivery mechanism. In one embodiment the signaling information from transmissions service provider 1200 may include channel information description 1210. An example of channel information description is provided later with respect to FIGS. 14A, 14B, 16, and 18. After receiving this channel information description 1210, the receiver 1240 may parse it or decode it. In one example the receiver 1240 may not be able to parse further signaling information until it parses the channel information description 1210. In one example the receiver 1240 may display some or all of channel information description 1210 to the viewer after decoding, parsing and rendering it. In some cases it may display this information on screen of the receiver device 1240 which can be viewed by the viewer. In an example case the viewer may make a decision based on this information that is received, parsed and displayed. In one example the decision may be to receive channel of the service. In this case the receiver 1240 may send a channel delivery request 1220 for the service to the transmission service provider 1200. In one example the receiver 1240 may receive delivery of channel from transmission service 1200.

FIGS. 13A-13B illustrate a binary syntax for a component information descriptor.

FIG. 13B includes fewer syntax elements compared to FIG. 13A and thus may be easier to transmit by the transmission service provider 1100 and may be easier to parse and decode by the receiver 1140.

The Component Information Descriptor of FIG. 13A and FIG. 13B provides information about the components available in the service. This includes information about number of components available in the service. For each available component following information is signaled: component type, component role, component name, component identifier, component protection flag. Audio, video, closed caption and application components can be signaled. Component role values are defined for audio, video and closed caption components.

The syntax for the Component Information Descriptor may conform to the syntax shown in FIG. 13A or FIG. 13B. In another embodiment instead of all of the component information descriptor only some of the elements in it maybe signalled in the component information descriptor or inside some other descriptor or some other data structure.

Semantic meaning of the syntax elements in the component information descriptor of FIG. 13A and FIG. 13B may be as follows.

descriptor_tag—This is 8-bit unsigned integer for identifying this descriptor. Any suitable value between 0-255 which uniquely identifies this descriptor can be signaled. In one embodiment the format of this field may be uimsbf. In another embodiment some other format may be used which allows identifying the descriptor uniquely compared to other descriptors based on this descriptor_tag value.

descriptor_length—This 8-bit unsigned integer may specify the length (in bytes) immediately following the field num_components up to the end of this descriptor. In some embodiments instead of 8-bit, this field may be 16-bit.

num_components—This 8-bit unsigned integer field may specify the number of components available for this service. The value of this field may be in the range of 1 to 127 inclusive. Values 128-255 are reserved. In an alternative embodiment this field may be split into two seprate fields: a 7-bit unsigned integer field num_components and a 1 bit rserved field.

component_type—This 3-bit unsigned integer may specify the component type of this component available in the service. Value of 0 indicates an audio component. Value of 1 indicates a video component. Value of 2 indicated a closed caption component. Value of 3 indicates an application component. Values 4 to 7 are reserved.

component_role—This 4-bit unsigned integer may specify the role or kind of this component. The defined values include one or more:

For audio component (when component_type field above is equal to 0) values of component_role are as follows:
0=Complete main,
1=Music and Effects,
2=Dialog,
3=Commentary,
4=Visually Impaired,
5=Hearing Impaired,
6=Voice-Over,
7-14=reserved,
15=unknown In another embodiment additionally component_role values for audiomay be defined as follows: 7=Emergency, 8=Karaoke. In this case the values 9-14 will be reserved and 15 will be used to signal unknown audio role.

For Video (when component_type field above is equal to 1) values of component_role are as follows:
0=Primary video,
1=Alternative camera view,
2=Other alternative video component,
3=Sign language inset,
4=Follow subject video,
5=3D video left view,
6=3D video right view,
7=3D video depth information,
8=Part of video array <x,y> of <n,m>,
9=Follow-Subject metadata,
10-14=reserved,
15=unknown For Closed Caption component (when component_type field above is equal to 2) values of component_role are as follows:
0=Normal,
1=Easy reader,
2-14=reserved,
15=unknown.

When component_type field above is between 3 to 7, inclusive, the component_role shall be equal to 15.

component_protected_flag—This 1-bit flag indicates if this component is protected (e.g. encrypted). When this flag is set to a value of 1 this component is protected (e.g. encrypted). When this flag is set to a value of 0 this component is not protected (e.g. encrypted).

component_id—This 8-bit unsigned integer nay specify the component identifier of this component available in this service. The component_id may be unique within the service.

component_name_length—This 8-bit unsigned integer may specify the length (in bytes) of the component_name_bytes( ) field which immediately follows this field.

component_name_bytes( )—Short human readable name of the component in "English" language. Each character of which may be encoded per UTF-8.

With respect to FIGS. 13 through 29 the format column of the descriptor may be interpreted as follows.

uimsbf: means Unsigned Integer, Most Significant Bit First, bslbf: means Bit string, left bit first.

FIGS. 14A-14B illustrate a binary syntax for a channel information descriptor. The Channel Descriptor of FIG. 14A and FIG. 14B provides information about the channel(s) in the service. This includes Major channel number, minor channel number, primary channel language, channel genre, channel description (in multiple languages) and channel icon.

The syntax for the Channel Descriptor may conform to the syntax shown in FIG. 14A or FIG. 14B. In another embodiment instead of all of the channel descriptor only some of the elements in it maybe signalled in the channel descriptor or inside some other descriptor or some other data structure.

Semantic meaning of the syntax elements in the channel descriptor of FIG. 14A and FIG. 14B is as follows.

descriptor_tag—This is 8-bit unsigned integer for identifying this descriptor. Any suitable value between 0-255 which uniquely identifies this descriptor can be signaled. In one embodiment the format of this field may be uimsbf. In another embodiment some other format may be used which allows identifying the descriptor uniquely compared to other descriptors based on this descriptor_tag value.

descriptor_length—This 8-bit unsigned integer may specify the length (in bytes) immediately following this field up to the end of this descriptor.

major_channel_num—This 16-bit unsigned integer may specify the major channel number of the service. In another embodiment the bit width of 8-bit or 12-bit may be used for this field instead of 16-bit.

minor_channel_num—This 16-bit unsigned integer may specify the minor channel number of the service in the case of channel descriptor shown in FIG. 14A. In another embodiment the bit width of 8-bit or 12-bit may be used for this field instead of 16-bit.

In the case of channel descriptor shown in FIG. 14B the bit width is changed to 15-bit. Thus for FIG. 14B this 15-bit unsigned integer may specify the minor channel number of the service. In another embodiment the bit width of 7-bit or 11-bit may be used for this field instead of 15-bit.

service_lang_code—Primary language used in the service. This field may consist of one of the 3 letter code in ISO 639-3 titled "Codes for the representation of names of languages—Part 3: Alpha-3 code for comprehensive coverage of languages available at http://www.iso.org which is incorporated by reference in its entirety here by reference. In other embodiments a pre-defined list of languages may be defined and this filed can be an index into the list of those fields. In an alternate embodiment 16 bits may be used for this field since upper bound for the number of languages that can be represented is 26×26×26 i.e. 17576 or 17576–547=17030.

service_lang_genre—Primary genre of the service. The service_lang_genre element may be instantiated to describe the genre category for the service. The <classificationSchemeURI> is http://www.atsc.org/XMLSchemas/mh/2009/1.0/genre-cs/ and the value of service_lang_genre may match a termID value from the classification schema in Annex B of A/153 Part 4 document titled "ATSC-Mobile DTV Standard, Part 4—Announcement" available at http://www.atsc.org which is incorporated in its entirety here by reference.

icon_url_length—This 8-bit unsigned integer may specify the length (in bytes) of the icon_url_bytes( ) field which immediately follows this field.

icon_url_bytes( )—Uniform Resource Locator (URL) for the icon used to represent this service. Each character may be encoded per Unicode Transmission Format (UTF)-8.

service_descriptor_length—This 8-bit unsigned integer may specify the length (in bytes) of the service_descr_bytes( ) field which immediately follows this field.

service_descr_bytes( )—Short description of the service. Either in "English" language or in the language identified by the value of service_lang_code field in this descriptor. Each character of which may be encoded per UTF-8.

The values of icon_url_length and service_descriptor_length are constrained as specified by the value of the descriptor_length field which provides information about the length of this entire descriptor.

With respect to FIG. 14B and additional syntax element is as follows: ext_channel_info_present_flag—This 1-bit Boolean flag that may indicate, when set to '1', that extended channel information fields for this service including the fields service_lang_code, service_genre_code, service_descr_length, service_descr_bytes( ), icon_url_length, icon_url_bytes( ) are present in this descriptor. A value of '0', may indicate that extended channel information fields for this service including the fields service_lang_code, service_genre_code, service_descr_length, service_descr_bytes( ), icon_url_length, icon_url_bytes( ) are not present in this descriptor.

Thus when using the channel descriptor shown in FIG. 14B by setting the ext_channel_info_present_flag value to 1 fewer elements compared to FIG. 14A can be signaled in the descriptor and thus it may be easier to transmit by the transmission service provider 1200 and may be easier to parse and decode by the receiver 1240.

In some embodiments it may be a requirement of bitstream conformance that when channel information descriptor (e.g. FIG. 14B) is included in a fast information channel then ext_channel_info_present_flag may be equal to 0. In another embodiment when channel information descriptor (e.g. FIG. 14B) is included for signaling in a location where bit efficiency is required then ext_channel_info_present_flag may be equal to 0.

In yet another embodiment it may be a requirement of a bitstream conformance that ext_channel_info_present_flag may be equal to 1.

In addition to the binary syntax of FIG. 13A or FIG. 13B for the component information descriptor, a different representation may be used. FIG. 15 illustrates a XML syntax and semantics for a component information descriptor. FIG. 17 illustrates a XML schema for a component information descriptor.

In addition to the binary syntax of FIG. 14A or FIG. 14B for the channel information descriptor, a different representation may be used. FIG. 16 illustrates a XML syntax and semantics for a channel information descriptor.

FIG. 18 illustrates a XML schema for a channel information descriptor.

Some additional embodiments are defined next. The following terms may be defined.

LLS (Low Level Signaling)—Signaling that provides information common to all services and pointers to service definition information.

SLS (Service Layer Signaling)—Signaling which provides information for discovery and acquisition of ATSC 3.0 services and their content components. They are carried over IP packets.

SLT (Service List Table)—Signaling information which is used to build a basic service listing and provide bootstrap discovery of SLS.

S-TSID (Service-based Transport Session Instance Description)—One of SLS XML fragments which provides the overall session description information for transport session(s) which carry the content components of an ATSC service.

Broadcast Stream—The abstraction for an Radio Frequency (RF) Channel, which is defined in terms of a carrier frequency centered within a specified bandwidth.

PLP (Physical Layer Pipe)—A portion of the RF channel which has certain modulation and coding parameters.

reserved—Set aside for future use by a Standard.

Low Level Signaling is described next.

Service List Table (SLT) is described next.

A Service List Table supports rapid channel scans and service acquisition by including the following information about each service in the broadcast stream:

Information necessary to allow the presentation of a service list that is meaningful to viewers and that can support initial service selection via channel number or up/down selection.

The information necessary to locate the Service Layer Signaling for each service listed.

Service List Table Bit Stream Syntax and Semantics is described next.

A Service List Table may consist of one or more sections. The bit stream syntax of a Service List Table section may be as shown in FIG. 19A and FIG. 19B.

The semantic definitions of the fields in the FIG. 19A and FIG. 19B are given below.

table_id—An 8-bit unsigned integer that may be set to a value to indicate that the table is a service_list_table_section( ).

SLT_section_version—This 4-bit field may indicate the version number of the SLT section. The SLT_section_version may be incremented by 1 when a change in the information carried within the service_list_table_section( ) occurs. When it reaches maximum value of '1111', upon the next increment it may wrap back to 0.

SLT_section_length—This 12-bit field may specify the number of bytes of this instance of the service_list_table_section( ) starting immediately following the SLT_section_length field.

SLT_protocol_version—An 8-bit unsigned integer that may indicate the version of the structure of this SLT. The upper four bits of SLT_protocol_version may indicate the major version and the lower four bits the minor version. For this first release, the value of SLT_protocol_version may be set to 0x10 to indicate version 1.0.

broadcast_stream_id—This 16-bit unsigned integer may identify the overall broadcast stream. The uniqueness of the value may be scoped to a geographic region (e.g. North America).

SLT_section_number—This 4-bit unsigned integer field may indicate the number of the section, starting at zero. A SLT may be comprised of multiple SLT sections.

last_SLT_section_number—This 4-bit unsigned integer field may specify the section with the highest value of SLT_section_number of the SLT of which this section is part. For example, a value of '0010' in last_SLT_section_number would indicate that there are three sections in total, labeled as '0000', '0001', and '0010' in SLT_section_number.

num_services—An 8-bit unsigned integer that may indicate the number of services to be described in this service_list_table_section( ).

service_id—A 16-bit unsigned integer number that may uniquely identify this service within the scope of this broadcast area.

SLT_service_seq_number—This 3-bit unsigned integer field may indicate the sequence number of the service information with service ID equal to the service_id field value in this iteration of the "for" loop. SLT_service_seq_number may start at 0 for each service and may be incremented by 1 every time any SLT service information for the service identified by service_id is changed. If the SLT service information for a particular service is not changed compared to the previous service information with a particular value of SLT_service_seq_number then SLT_service_seq_number may not be incremented. The service info_seq number field may wrap back to 0 after reaching the maximum value.

protected—This 1-bit flag may indicate, when set, that one or more components necessary for meaningful presentation may be protected. When set to '0', this flag may indicate that no components necessary for meaningful presentation of the service are protected.

major_channel_number—A 10-bit unsigned integer number in the range 1 to 999 that may represent the "major" channel number of the service being defined in this iteration of the "for" loop. Each service may be associated with a major and a minor channel number. The major channel number, along with the minor channel number, act as the user's reference number for the virtual channel. The value of major_channel_number may be set such that in no case is a major_channel_number/minor_channel_number pair duplicated within the SLT minor_channel_number—A 10-bit unsigned integer number in the range 1 to 999 that may represent the "minor" or "sub"-channel number of the service. This field, together with major_channel_number, provides a two-part channel number of the service, where minor_channel_number represents the second or right-hand part of the number.

service_category—This 4-bit unsigned integer field may indicate the category of this service, coded ash shown in FIG. 20.

short_service_name_length—This 4-bit unsigned integer may indicate the length in bytes of the short_service_name( ) field to follow. When there is no short name provided for this service, the value of this field may be set to 0.

short_service_name( )—This field, if present, may represent the short name of the service. Each character in the name may be encoded per UTF-8.

broadcast_signaling_present—A 1-bit Boolean flag that may indicate, when set to '1', that the fields beginning at SLS_PLP_ID and ending after the fields associated with num_ext_length_bits (which, if num_ext_length_bits is non-zero, include ext_length, possibly reserved1, and reserved2( )), as shown in the syntax given in FIG. 19A and FIG. 19B, are present. A value of '0' may indicate that these fields are not present in this iteration of the "for" loop.

When broadcast_signaling_present is equal to '0' there may be at least one Internet Signaling Location Descriptor (inet_signaling_location_descriptor( )) present at the SLT level or at the service level for the service in this iteration of the "for" loop and that inet_signaling_location_descriptor( ) may include a URL of URL_type 0x00 (URL to signaling server). If this Internet Signaling Location Descriptor (inet_signaling_location_descriptor( ) is present at the SLT level the URL of URL_type 0x00 in the inet_signaling_location_descriptor( ) may support the query parameter svc=<service_id> where service_id corresponds to the value of service_id field in this iteration of the "for" loop.

The above constraint provides the capability that when the service level signaling information is not present in the broadcast signaling for a service then it may be present in broadband signaling. For this the above constraints are described regarding inclusion of Internet signaling location descriptor in the service list table level and in the service level.

If the above constraints are not enforced then ther service list table will be allowed to signal services for which signaling information is not signaled in either broadcast or broadband. As such these services could be accessed by the user/viewer thus resulting in a poor user experience. The above constraints essentially make sure that if for a particular service the broadcast signaling information is not included then the signaling information must be provided for this service vis broadband e.g. by including an Internet Signaling Location Descriptor (inet_signaling_location_descriptor( ).

broadband_access_required—1-bit Boolean flag that may indicate, when set to '1', that the service identified by service_id requires the receiver to have broadband access in order to offer a meaningful presentation of the service. When set to '0', the service identified by service_id does not require broadband access in order to offer a meaningful presentation.

SLS_source_IP_address_present—A 1-bit Boolean flag that may indicate, when set to '1', that the SLS_source_IP_address field is present. A value of '0', may indicate that no SLS_source_IP_address field is present in this iteration of the "for" loop. When not present the value of SLS_source_IP_address present may be inferred to be equal to '0'.

SLS_protocol_type—A 4-bit unsigned integer that may indicate the type of protocol of Service Layer Signaling channel on top of UDP/IP, coded as shown in FIG. 21, for the service described in this iteration of the "for" loop. Receivers are expected to parse past the data fields and disregard services for which the SLS_protocol_type is unknown or unsupported.

SLS_PLP_ID—This 8-bit unsigned integer field may represent the identifier of the Physical Layer Pipe that contains the Service Layer Signaling data for this service. It will typically be a more robust pipe than other pipes used by the service.

SLS_destination_IP_address—This field may contain the 32-bit IPv4 destination IP address of the Service Layer Signaling channel for this service.

SLS_destination_UD_port—This 16-bit unsigned integer field may represent the destination UDP port number of the Service Layer Signaling channel for this service.

SLS_source_IP_address—When present, this field may contain the source IPv4 address associated with the Service Layer Signaling for this service.

SLS_protocol_version—This 8-bit unsigned integer field may indicate the version of the protocol identified in SLS_protocol_type that will be used to provide SLS for this service. The meaning of SLS_protocol_version depends upon the protocol in use (e.g. the value of SLS_protocol_type).

Preferably the receivers will not offer to the user services labeled with a value of major_protocol_version higher than that for which the receiver was built to support. Receivers preferably do not use minor_protocol_version as a basis for not offering a given service to the user. Receivers preferably use minor_protocol_version to determine whether the transmission includes data elements defined in later versions of the Standard.

num_ext_length_bits—This 4-bit unsigned integer in the range 0 to 12 may specify the length in bits of the ext_length field. A value of zero may mean that the reserved1, ext_length, and reserved2( ) fields are not present in this iteration of the "for" loop.

reserved1—This field of length (8—num_ext_length_bits%8) bits may have each bit equal to 1 for this version of this specification. The % operator may compute the integer remainder after dividing its first operand by its second operand. If (num_ext_length_bits%8) yields zero, the reserved1 field may not be present in this iteration of the "for" loop.

ext_length—This unsigned integer of length num_ext_length_bits bits may specify the length (in bytes) of the reserved2( ) data immediately following this field.

reserved2( )—This protocol extension field of length 8*ext_length bits may have any value.

num_service_level_descriptors—Zero or more descriptors providing additional information for the service may be included. This 4-bit unsigned integer field may specify the number of service level descriptors for this service. A value of zero may indicate that no descriptors are present.

service_level_descriptor( )—The format of each descriptor may be an 8-bit type field, followed by an 8-bit length field, followed by a number of bytes indicated in the length field.

num_SLT_level_descriptors—Zero or more descriptors providing additional information for the SLT may be included. This 4-bit field may specify the number of SLT-level descriptors included in this this service_list_table_section( ). A value of zero may indicate that no descriptors are present.

SLT_level_descriptor( )—The format of each descriptor may be an 8-bit type field, followed by an 8-bit length field, followed by a number of bytes indicated in the length field.

reserved3—SLT extension data bytes (N) may have any value.

For syntax of service list table as shown in FIG. 19A and FIG. 19B the following design consideration has been used.

First a syntax element which indicates if source IP address syntax element is signaled is signaled only when broadcast signaling information is present for the service. When not signaled in this manner the source IP address element's presence is inferred. A bit is kept reserved in this case.

Thus the syntax element "SLS source_IP_address present" is signalled only when the syntax element "broadcast signaling present" has a value of "true" or 1. Thus only when broadcast signaling is included for a particular service in the service list table the syntax element "SLS_source_IP_address_present" is signalled for that service in the service list table. Otherwise that bit is kept reserved. Keeping a bit reserved allows future extensibility.

In another emodiment the syntax element "SLS_source_IP_address_present" is signalled only when the syntax element "broadcast_signaling_present" has a value of "true" or 1. Thus only when broadcast signaling is included for a particular service in the service list table the syntax element "SLS_source_IP_address_present" is signalled for that service in the service list table. Otherwise that bit is not signaled. Not signaling a bit increases the bit efficiency of the signaling protocol. Also the receiver does not need to parse the bit in thie case thus reducing the complexity.

Second a syntax element is positioned at a different location to allow reserved bits to be contiguous. Thus instead of signaling the syntax element "broadband_Access_required" after the syntax element "SLS_source_IP_address_present" in the bistream order, the syntax element "broadband_Access_required" is signalled before the syntax element "SLS_source_IP_address_present". Thus when the syntax element "broadcast_signaling_present" has a value of "false" or 0 the two "reserved" syntax element bits are contiguous. Thus decoding them in this manner results in lower complexity decoding. In one embodiment in this case the two bits could be alternatively indicated as "reserved" (2 bits) or as a single syntax "reserved 2bits" as shown below.

```
broadband_access_required              1    bslbf
if (broadcast_signaling_present) {
    SLS_source_IP_address_present      1    bslbf
    reserved}                          1    '1'
else
    reserved                           2    '11'
    SLS_protocol_type                  4    uimsbf
...
```

Zero or more descriptors providing additional information about a given service or the set of services delivered in any instance of an SLT section may be included. FIG. 22 specifies an exemplary the bit stream syntax of the inet_signaling_location_descriptor( ).

The inet_signaling_location_descriptor( ) contains a URL telling the receiver where it can acquire any requested type of data from external server(s) via broadband. FIG. 22 shows the structure of the descriptor.

descriptor_tag—This 8-bit unsigned integer may have a value, identifying this descriptor as being the inet_signaling_location_descriptor( ).

descriptor_length—This 8-bit unsigned integer may specify the length (in bytes) immediately following this field up to the end of this descriptor.

URL_type—This 8-bit unsigned integer field may indicate the type of URL, coded as shown in FIG. 23.

URL_bytes( )—Uniform Resource Location (URL), each character of which may be encoded per UTF-8. In the case of a URL to a signaling server, this base URL can be extended by one of the query terms as shown in FIG. 24, in order to indicate the resource(s) desired. In the case of a URL to an ESG server, this URL may be used as specified in the ESG broadband delivery specifications.

When resources are available over the broadband network environment, the inet_signaling_location_descriptor( ) can provide the URL of those resources.

When inet_signaling_location_descriptor( ) is located at SLT level, URL can be used by a query term to indicate what the type of resource is by which requesting with this URL. If the type of resource is SLS, it gives a single URL where the receiver can retrieve SLS over broadband for all services described in this SLT. In this case, the optional parameter identifying the service of interest ("[&svc=<service_id>") is very useful and the receiver can request SLS for a specific service if the svc query string is appended at the end of the query terms. The response body for those query terms will have multi-part encapsulation for the retrieved SLS fragments. If the type of resource is ESG, it gives a single URL where the receiver can retrieve ESG over broadband for all services described in this SLT.

When inet_signaling_location_descriptor( ) is delivered in the service level descriptor loop as shown in FIG. 25, this indicates a URL where Service Layer Signaling belonging to the service can be retrieved from the broadband connection. If the service_category indicates an A/V service, the URL can be sent with a query term in order to indicate the signaling description(s) desired. Different SLS URLs may be provided for each service. In this case, the optional svc=<service_id> at the end of the query string may not be used. The response body for those queries will use multi-part encapsulation for retrieval of the SLS fragments.

FIG. 26A and FIG. 26B show an XML format for the service list table. This is analogus to the bitstream syntax for the service list table shown in FIG. 19A and FIG. 19B. In service list table XML syntax of FIG. 26B constraints are described on the inclusion of several elements when another element is present. Also constraints are described on the exclusion of several elements when another element is not present. Without such constraints the cardinality of some elements of 0 . . . 1 would allow inclusion of some syntax elements but not the others in such a manner that incorrect/confusing information could be signalled. The imposed constraints make sure that either each of relevant syntax elements which together belong as a unit is signalled or none of them are signalled.

FIG. 27 shows an XML format for the Internet signaling location descriptor. This is analogus to the bitstream syantax for the service list table shown in FIG. 22.

With respect to FIG. 26B in additional variants, for the XML format SLT table the constraint may be expressed as follows.

When attribute slsPlpId is not present, the element InetSigLocation may be present as a child element of the slt root element or as child element of this service element and the attribute urlType of the InetSigLocation element may include URL_type 0x00 (URL to signaling server). In the case InetSigLocation element is present as a child element of the slt root element, its attribute url for URL_type 0x00 may support the query parameter svc=<service_id> where service_id corresponds to the serviceId attribute for the parent Service element.

A few additional variants for service list table XML format are described next.

In another variant, a @broadcastSignalingPresent attribute may be included in the Service list table (SLT) XML format. In one embodiment it may be a child element of Service element as follows. This may be as illustrated in FIG. 28.

In yet another variant, Instead of an attribute @broadcastSignalingPresent, an element BroadcastSignaling may be included in the Service list table (SLT) XML format and the attributes which all relate to broadcast signalling will be included as attributes of this BroadcastSignaling element. In one embodiment the BroadcastSignaling element may be a child element of Service element as follows. This may be as illustrated in FIG. 29.

Another example syntax, semantics and description for the service list table is provided below.

The syntax of an exemplary Service List Table is shown in FIG. 30. The semantic definitions of the fields in the FIG. 30 are given below.

SLT—Root element of the service list table.

@bsid—Identifier of the whole broadcast stream. The value of bsid is preferably unique on a regional level (for example, North America). An administrative or regulatory authority may play a role in defining bsid.

@sltCapabilities—Required capabilities for decoding and meaningfully presenting the content for all the services in this SLT instance.

sltInetUrl—This element describes base URL to acquire Electronic Service Guide (ESG) or service level signaling files for all services in this SLT via broadband, if available.

@URLtype—Type of files available with the sltInetUrl (ESG or signaling or service usage data gathering report server). FIG. 31 shows values defined for URLType.

Service—Service information.

@serviceId—16-bit integer that may uniquely identify this Service within the scope of this broadcast area.

@sltSvcSeqNum—This integer number preferably indicates the sequence number of the SLT service information with service ID equal to the serviceId attribute above. sltSvcSeqNum value preferably starts at 0 for each service and is preferably incremented by 1 every time any attribute or child of this Service element is changed. If no attribute or child element values are changed compared to the previous Service element with a particular value of serviceID then sltSvcSeqNum is preferably not incremented. The sltSvcSeqNum field wraps back to 0 after reaching the maximum value.

@protected—When set to "true" indicates that one or more components necessary for meaningful presentation is protected. When set to "false", indicates that no components necessary for meaningful presentation of the service are protected. Default value is false.

@majorChannelNo—An integer number in the range 1 to 999 that that preferably represents the "major" channel number of the service. This number is not required for services that are not intended to be selected directly by viewers, such as an ESG data delivery service or an Emergency Alert Service (EAS) rich media delivery service.

@minorChannelNo—An integer number in the range 1 to 999 that preferably represents the "minor" channel number of the service. This number is not required for services that are not intended to be selected directly by viewers, such as an ESG data delivery service or an EAS rich media delivery service.

@serviceCategory—8-bit integer that indicates the category of this service. The value may be coded as shown in FIG. 32.

@shortServiceName—Short name of the Service (up to 7 characters). This name is not required for services that are not intended to be selected directly by viewers, such as an ESG data delivery service or an EAS rich media delivery service.

@hidden—Boolean value that when present and set to "true" preferably indicates that the service is intended for testing or proprietary use, and is not intended to be selected by ordinary TV receivers. The default value is "false" when not present.

@broadbandAccessRequired—A Boolean indicating that broadband access is required for a receiver to make a meaningful presentation of the service. Default value is false.

@svcCapabilities—Required capabilities for decoding and meaningfully presenting the content for the service with service ID equal to the serviceId attribute above.

In many situations it is desirable to ensure that the service is available in some manner for the device by signaling information about the service, such as by using a BroadcastSvcSignaling element. In this manner, when the BroadcastSvcSignaling element is signaled then the service is available to the device by a broadcast reception, such as a satellite broadcast or over-the-air broadcast. In this manner, when the BroadcastSvcSignaling is not present then it is required that the service information and/or actual service is available using a broadband signaling, such as an Internet connection. This provides an efficient mechanism to ensure suitable service availability.

BroadcastSvcSignaling—This element and its attributes provides broadcast signaling related information. When the BroadcastSignaling element is not present, the element svcInetUrl of the parent Service element (i.e. Service .svcInetUrl element) is preferably present and attribute urlType of svcInetUrl (i.e. Service.svcInetUrl@urlType attribute) includes value 1 (URL to signaling server), or the element sltInetUrl is present as a child element of the SLT root element (i.e. SLT.sltInetUrl element) and its attribute urlType (i.e. SLT.sltInetUrl@urlType attribute) includes value 1 (URL to signaling server) and supports the <service_id>path term where service_id corresponds to the serviceId attribute for the parent Service element (i.e. Service@ serviceId attribute) of this BroadcastSvcSignaling element.

It is desirable to ensure that sufficient attribute information is available for the BroadcastSvcSignaling element to ensure that the sufficient and all the required service information is available to access the service. To ensure sufficient service information is available it is desirable to require many different attributes for the BroadcastSvcSignaling element; which provide broadcast signaling information, including, (1) type of protocol; (2) major version number; (3) minor version number; (4) integer number indicating the PLP Identifier (ID); (5) a string containing the Internet Protocol (IP) version 4 (IPv4) destination address; (6) destination port number of the packets; and (7) a string containing the IPv4 source address. In this manner, these all interrelated types of information is provided in a manner that is sufficient for accessing the broadcast service.

@slsProtocol—An attribute indicating the type of protocol of service layer signaling used by this service, preferably coded as shown in FIG. 33.

@slsMajorProtocolVersion—Major version number of the protocol used to deliver the service layer signaling for this service. Default value is 1.

@SlsMinorProtocolVersion—Minor version number of the protocol used to deliver the service layer signaling for this service. Default value is 0.

@slsPlpId—Integer number indicating the PLP Identifier (ID) of the physical layer pipe carrying the service layer signaling for this service.

@slsDestinationIpAddress—A string containing the Internet Protocol (IP) version 4 (IPv4) destination address of the packets carrying SLS data for this service.

@slsDestinationUdpPort—Port number of the packets carrying service layer signaling data for this service.

@slsSourceIpAddress—A string containing the IPv4 source address of the packets carrying service layer signaling data for this service.

In many embodiments, it is desirable to include the capability of using different URLs for signalling different types of broadband server information. As an example for the same service signaling server information and service usage data gathering report server information may need to be signalled at the same time. This added flexibility may be achieved by using a cardinality of 0 . . . N for SvcInetUrl. In this manner, the system includes the flexibility of using more than one type of URL.

svcInetUrl—Base URL to access ESG or service level signaling files for this service via broadband, if available.

@URLtype—Type of files available with svcInetUrl. FIG. 31 shows exemplary values for this.

Further description about broadband delivery of signaling metadata is provided below.

When an sltInetSigUrl attribute is present, it can be used as a base URL to make Hypertext Transfer Protocol (HTTP) requests for obtaining signaling metadata. The desired signaling objects to be returned are indicated by appending path terms to the base URL. Examplary path terms are defined in FIG. 34. This may make the retrieval of the signaling objects more efficient from the server standpoint, since no server side application is required to retrieve the desired objects. Each retrieval simply fetches a file. To make such a request, the HTTP GET method may be used, and the path appended to the end of the base URL contains terms indicating the desired signaling object or objects, as indicated in FIG. 34.

When an sltInetSigUrl base URL appears in the service list table, the service_id term is used to indicate the service to which the requested signaling metadata objects apply. If the service_id term is not present, then the signaling metadata objects for all services in the section are requested.

In FIG. 34, the "normal|diff|template" term indicates whether the normal form of the metadata object(s), the diff form of the metadata object(s), or the template form of the metadata object(s) is requested. If the normal form is desired, the normal term may be omitted.

In FIG. 34, the "current|next" term indicates whether the current version of the metadata object(s) or the next version of the metadata object(s) after the current version is requested. If the current version is desired, then the current term may be omitted.

In FIG. 34, the term shown in last row is used to indicate which type of metadata object(s) are desired. The supported types are listed in FIG. 35, with their descriptions.

Some examples of the URL for an HTTP request for signaling metadata objects are shown below:

```
<sltInetSigUrl>/0x2107/RD - returns the current, normal version of all
   ROUTE/DASH signaling objects for service with service_id 0x2107
<sltInetSigUrl>/0x2103/next/MPD - returns the next, normal version of the
   MPD for service with service_id 0x2103
<sltInetSigUrl>/0x2104template/AST - returns the current, template
   version of the AST for service with service_id 0x2104
```

When an svcInetSigUrl appears (at the service level), then the same paths can be appended to the end of it, with the same semantics, except that no service term appears, since it is not needed to designate the desired service.

The response body for those HTTP requests may include a metadata envelope containing an item element for each signaling object included in the response. Either zero or one of the signaling objects may be embedded in an item element. Any signaling objects that are not embedded may be referenced in their item elements, and they may be packaged together with the metadata envelope in a multi-part message, in the order in which they are referenced. The validFrom and validUntil attributes of the item elements should be present, to indicate the interval of validity of each signaling object.

The item element of the metadata envelope may be extended by the addition of the following attribute, defined in an ATSC namespace:

<xs:attribute nanne="nextUrl" type="xs:anyURI" use="optional"/>.

When present, the URL given by this attribute ("nextUrl") may be the URL of the next scheduled update to the signaling object described in the item element.

Thus, when the validUntil time approaches for a signaling object that was acquired via broadband, the device can acquire the next scheduled update to the signaling object by making an HTTP GET request with the URL given by the nextURL attribute in the item element that was used to represent the signaling object in the metadata envelope.

If an unscheduled update is made to a signaling object, a dynamic event will be issued announcing the update. A device can then acquire the updated signaling object, using the URL in the data attribute of the dynamic event.

When a sltInetUrl element is present as a child element of SLT element, and its attribute urlType includes value 2 (URL to ESG server), the URL specified by this sltInetUrl element can be used to retrieve ESG data via broadband for all services in the SLT.

When a svcInetEsgUrl attribute svcInetUrl element is present for a service and its attribute urlType includes value 2 (URL to ESG server), the URL specified by the svcInetUrl element can be used to retrieve ESG data via broadband for the service with the same service_id as the service element in which the this svcInetUrl element appears. In this case the URL specified by the svcInetUrl element is used for queries as specified in the ATSC 3.0 Service Announcement.

Although FIG. 13 through FIG. 35 show particular embodiments of syntax, semantics and schema, additional variants are possible. These include the following variations:

Different data types may be used for an element compared to those shown above. For example instead of unsignedByte data type unsignedShort data type may be used. In another example instead of unsigned Byte data type a String data type may be used.

Instead of signalling a syntax as an attribute it may be signalled as an element. Instead of signalling a syntax as an element it may be signalled as an attribute.

The bit width of various fields may be changed for example instead of 4 bits for an element in the bitstream syntax 5 bits or 8 bits or 2 bits may be used. The actual values listed here are just examples.

Instead of XML format and XML schema Javascript Object Notation (JSON) format and JSON schema may be used. Alternatively the proposed syntax elements may be signalled using a Comma Separated Values (CSV), Backus-Naur Form (BNF), Augmented Backus-Naur Form (ABNF), or Extended Backus-Naur Form (EBNF).

Cardinality of an element and/or attribute may be changed. For example For example cardinality may be changed from "1" to "1 . . . N" or cardinality may be changed from "1" to "0 . . . N" or cardinality may be changed from "1" to "0 . . . 1" or cardinality may be changed from "0 . . . 1" to "0 . . . N" or cardinality may be changed from "0 . . . N" to "0 . . . 1".

An element and/or attribute may be made required when it is shown above as optional. An element and/or attribute may be made optional when it is shown above as required.

Some child elements may instead be signalled as parent elements or they may be signalled as child elements of another child elements.

All the above variants are intended to be within the scope of the present invention.

Moreover, each functional block or various features of the base station device and the terminal device (the video decoder and the video encoder) used in each of the aforementioned mentioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above.

Various modifications, changes and variations may be made in the arrangement, operation and details of the systems, methods, and apparatus described herein without departing from the scope of the claims.

The invention claimed is:

1. A method for decoding a service list table associated with a bitstream comprising:
   (a) receiving a sltInetUrl element that is an element of said service list table in a case that said sltInetUrl element is present and indicates a base URL to acquire electronic service guide or service layer signaling files available via broadband for services in said service list table;
   (b) receiving a first urlType attribute in a case that said sltInetUrl element is present in said service list table, that is an attribute of said sltInetUrl element and indicates types of files available with said base URL;
   (c) receiving a service element that is an element of said service list table and indicates service information of a service;
   (d) receiving a serviceId attribute that is an attribute of said service element and indicates an integer number that identifies said service within a scope of a broadcast area;
   (e) receiving a sltSvcSeqNum attribute that is an attribute of said service element and indicates the sequence number of an SLT Service information with Service ID equal to said serviceId attribute, wherein the sltSvcSeqNum value starts at 0 for each Service and is incremented by 1 every time any attribute or child of said service element is changed;
   (f) receiving a serviceCategory attribute that is an attribute of said service element and indicates a category of a service with a 8-bit integer, wherein 4 of the category of the service indicates ESG service (program guide) and 5 of the category of the service indicates EAS service (emergency alert);
   (g) receiving a svcInetUrl element in a case that said svcInetUrl element is present in said service list table, that is a child element of said service element and indicates a URL to access Internet signaling for said service;
   (h) receiving a second urlType attribute in a case that said svcInetUrl element is present in said service list table, that is an attribute of said svcInetUrl element and indicates types of files available with said URL;
   (i) receiving a broadcastSvcsSignaling element that is a child element of said service element in a case that said broadcastSvcsSignaling element is present in said service list table, that provides broadcast signaling related information.

* * * * *